(12) United States Patent
Heim

(10) Patent No.: US 10,901,551 B2
(45) Date of Patent: Jan. 26, 2021

(54) METHOD AND SYSTEM FOR TOUCHLESS GESTURE DETECTION AND HOVER AND TOUCH DETECTION

(71) Applicant: Microchip Technology Incorporated, Chandler, AZ (US)

(72) Inventor: Axel Heim, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/283,923

(22) Filed: Feb. 25, 2019

(65) Prior Publication Data

US 2019/0272059 A1 Sep. 5, 2019

Related U.S. Application Data

(60) Provisional application No. 62/637,002, filed on Mar. 1, 2018.

(51) Int. Cl.
| | | |
|---|---|---|
| G06F 3/01 | (2006.01) | |
| G06F 3/041 | (2006.01) | |
| G06F 3/044 | (2006.01) | |

(52) U.S. Cl.
CPC .......... *G06F 3/0416* (2013.01); *G06F 3/017* (2013.01); *G06F 3/044* (2013.01);
(Continued)

(58) Field of Classification Search
CPC ........ G06F 3/0416; G06F 3/044; G06F 3/017; G06F 2203/04101; G06F 2203/04108; G06F 2203/04104
See application file for complete search history.

(56) References Cited

U.S. PATENT DOCUMENTS

| | | | |
|---|---|---|---|
| 2016/0117014 A1* | 4/2016 | Davison | G06F 3/04186 345/174 |
| 2016/0261250 A1* | 9/2016 | Heim | H03H 17/06 |
| 2017/0102815 A1* | 4/2017 | Portmann | G06F 3/03547 |

OTHER PUBLICATIONS

"MGC3130: Single-Zone 3D Gesture Controller Data Sheet," Microchip Technology Incorporated, URL: http://ww1.microchip.com/downloads/en/DeviceDoc/41667A.pdf, 40 pages, Dec. 11, 2012.
(Continued)

*Primary Examiner* — Ryan A Lubit
(74) *Attorney, Agent, or Firm* — Slayden Grubert Beard PLLC

(57) ABSTRACT

A sensor system combining first and second detection systems supplies drive signals to nodes A and B electrodes of these systems. A drive sequence consists of a repetition of an elementary acquisition cycle having two consecutive main phases with pre-charge and acquisition phases. During a first pre-charge phase, node A is driven to a first electrical potential for and during a first acquisition phase, to a first intermediate electrical potential, and node B is driven to a second electrical potential and thereafter switches node B into high-impedance at DC, and during a second pre-charge phase, node A is driven to a third electrical potential and, during a second acquisition phase, to a second intermediate electrical potential, and node B is driven to a fourth potential and thereafter switches node B into high-impedance at DC. The first and second detection systems perform an electrical measurement on node A and B, respectively.

36 Claims, 18 Drawing Sheets

(52) U.S. Cl.
CPC .............. *G06F 2203/04101* (2013.01); *G06F 2203/04104* (2013.01); *G06F 2203/04108* (2013.01)

(56) References Cited

OTHER PUBLICATIONS

International Search Report and Written Opinion, Application No. PCT/US2019/020023, 15 pages, dated May 7, 2019.

\* cited by examiner

METHOD AND SYSTEM FOR TOUCHLESS GESTURE DETECTION AND HOVER AND TOUCH DETECTION

RELATED PATENT APPLICATION

This application claims priority to commonly owned U.S. Provisional Patent Application Ser. No. 62/637,002; filed Mar. 1, 2018; entitled "Method And System For Touchless Gesture Detection And Hover And Touch Detection," and is hereby incorporated by reference herein for all purposes.

TECHNICAL FIELD

The present disclosure relates to human device interfaces, in particular to a method and system for gesture detection and hover and touch detection.

BACKGROUND

The "GestIC®" integrated circuit, also known as MGC3130 manufactured by the Assignee of this application, is a highly sensitive capacitive sensing technology used for non-touching gesture detection using an alternating electric near field, for example around 40-250 kHz. Human Machine Interface (HMI) devices using capacitive sensing comprise sensor electrodes that are often formed in layers of conductive material, e.g. stripes of copper of printed circuit board layer (PCB) or indium tin oxide (ITO) on glass. These electrodes are electrically connected to a gesture detection unit, for example, on the same PCB or a separate board. The gesture detection unit's measurement value, among others, depends on the position of a target object (finger/hand) in the sensor electrode's vicinity which influences the capacitive coupling between electrode and target, yielding a target measurement signal depending on the distortion of the alternating electric field. The gestures are performed above a detection area without touching any area of the respective device.

An additional touch detection sensor device is usually used to precisely determine a touch point. Touch detection generally cannot be performed from the 3D coordinates, in particular the vertical distance, which is provided by the 3D-detection system. For example, because such a system determines a disturbance of the generated electric field to generate 3D position data, the system identifies a location within an object, such as a center of gravity or center of mass. Therefore, a touch of another part of an object may occur while a determined distance in the vertical direction is still greater than 0. To this end, generally multiplexing is used between a pure touch detection system and a 3D-detection system due to the nature of the difference between the detection systems. United States Patent Application US2016/0261250A1 discloses an example for such a time multiplex system which is hereby incorporated by reference in its entirety.

FIG. 1 shows a typical 2D/3D gesture/touch detection system 100 available from the assignee of the present application which runs 2D scans and 3D scans in a time-multiplexing manner. Such a system provides for a touch grid 150 and four receiving electrodes 110-140. The touch grid may also operate as a transmission electrode when operating in the 3D mode. Such a system may operate as shown in FIG. 1a with multiplexing periods of, for example, 12 ms duration, where for a 2 ms time slot the 2D scanning is active, and for the remaining 10 ms time slot the 3D scanning is active while the 2D electrode grid 150 is driven with a transmission signal Tx to support the 3D scanning. That is, it is performing time-multiplexing where the channel access is alternating between 2D and 3D scanning, and each time slot for 2D or 3D scanning contains a multitude of Elementary Acquisition Cycles as will be discussed in more detail below. If during the 2 ms time slot for 2D scanning a touch is detected, then the system goes into a 2D-only mode until no longer a touch is detected, i.e. the touch is released, and the multiplexing between 2D and 3D scanning is continued. This is illustrated in the flow chart of FIG. 9.

However, such multiplexing has usually a high maximum delay of a first-touch detection. While the system is in the 3D scanning mode, a touch on the 2D grid cannot be detected. Such a touch can only be detected once the system is back in 2D touch-detection mode for the reasons explained above. Therefore, this solution experiences an additional delay of up to 10 ms for the first-touch detection compared to a 2D-only system with 100% scan time.

While a system operates in one of the two operation modes, no data is acquired for the other operation mode. This directly reduces the received signal energy. For example, for the above configuration, 3D measurement sensitivity is reduced to (10 ms/12 ms)=83% compared to a 3D-only system.

Furthermore, multiplexing also reduces noise suppression capability for 3D scans. The lack of continuity in timing when acquiring data significantly reduces the capability of digital filters, e.g. low-pass filters, to suppress energy at frequencies where there is only noise but no signal. FIG. 19 shows the 3D GestIC® susceptibility to single-tone noise—considering the digital filtering only—for a carrier frequency of fTx=100 kHz. It is assumed a sampling frequency of 2*fTx=200 kHz and down-sampling to 1 kHz. Two out of twelve samples at 1 kHz are periodically discarded, being reflected in the puncturing pattern PP=[0 0 1 1 1 1 1 1 1 1 1 1]. The bottom plot shows a zoom into the top plot around the carrier frequency. We observe that susceptibility to noise significantly increases, most severely near the carrier frequency (as well as odd multiples of it, which is not shown in the picture), where new side-peaks arise for the case with time-multiplexing, distinctively above −60 dB even when more than 1 kHz away from the carrier frequency. Reduced noise suppression capability directly implies reduced detection range in noisy environments.

Further, noise suppression capability is reduced for 2D scans. To maximize the detection range and noise robustness for 3D scanning, the 3D scan time is maximized to 10 ms out of 12 ms, leaving only two milliseconds scan time for 2D. This scan time merely suffices to detect an initial touch, but not to perform noise robust hover position tracking.

SUMMARY

There exists a need for a capacitive sensing system for multi-finger 2D touch detection including hover detection, i.e. near-field (<5 cm) detection and tracking of one or more fingers, as well as mid-range or '3D' (~5-20 cm) position tracking and gesture detection.

According to an embodiment, a sensor system may combine a first detection system and a second detection system, wherein the sensor system is configured to supply drive signals to electrodes of the first detection system and the second detection system, wherein the drive signals comprise a drive sequence consisting of a repetition of an elementary acquisition cycle, each elementary acquisition cycle comprising two consecutive main phases, wherein during a first main phase, the sensor system is configured, during a pre-charge phase of the first main phase, to drive a node A coupled with at least one electrode of the first detection system to a first electrical potential for at least some time of the pre-charge phase of the first main phase and during an acquisition phase of the first main phase, to drive node A to a first intermediate electrical potential for at least some time of the acquisition phase of the first main phase, and to drive a node B coupled with at least one electrode of the second detection system to a second electrical potential for at least some time of the pre-charge phase of the first main phase and thereafter to switch node B into high-impedance at DC for at least some time of the acquisition phase of the first main phase, and wherein during a second main phase, the sensor system is configured, during a pre-charge phase of the second main phase, to drive node A to a third electrical potential for at least some time of the pre-charge phase of the second main phase and, during an acquisition phase of the second main phase, to drive node A to a second intermediate electrical potential for at least some time of the acquisition phase of the second main phase, and to drive node B to a fourth electrical potential for at least some time of the pre-charge phase of the second main phase and thereafter to switch node B into high-impedance at DC for at least some time of the acquisition phase of the second main phase, wherein the first detection system is further configured to perform an electrical measurement on node A, and wherein the second detection system is further configured to perform an electrical measurement on node B.

According to a further embodiment, a method for combining a first detection method and a second detection method, may comprise: supplying drive signals to electrodes, wherein the drive signals comprise a drive sequence consisting of a repetition of an elementary acquisition cycle, each elementary acquisition cycle (EAC) consisting of two consecutive main phases, wherein during a first main phase, driving a node A coupled with at least one electrode, during a pre-charge phase of the first main phase, to a first electrical potential for at least some time of the pre-charge phase of the first main phase and, during an acquisition phase of the first main phase, driving node A to a first intermediate electrical potential for at least some time of the acquisition phase of the first main phase, and driving a node B to a second electrical potential for at least some time of the pre-charge phase of the first main phase and thereafter to switch node B into high-impedance at DC for at least some time of the acquisition phase of the first main phase, and wherein during a second main phase, driving node A, during a pre-charge phase of the second main phase, to a third electrical potential for at least some time of the pre-charge phase of the second main phase and, during an acquisition phase of the second main phase, driving node A to a second intermediate electrical potential for at least some time of the acquisition phase of the second main phase, and driving node B to a fourth electrical potential for at least some time of the pre-charge phase of the second main phase and thereafter to switch node B into high-impedance at DC for at least some time of the acquisition phase of the second main phase, performing an electrical measurement on node A, and performing an electrical measurement on node B.

According to another embodiment of the above sensor system or method, the first detection system can further be configured to perform an electrical measurement on node A while driving node A to the first and second intermediate electrical potential, respectively, and wherein the second detection system is further configured to measure an electrical potential on node B which is reached after switching node B into high-impedance at DC. According to another embodiment of the above sensor system or method, the first intermediate electrical potential can be lower than the first electrical potential, and the second intermediate can be higher than the third electrical potential. According to another embodiment of the above sensor system or method, the first electrical potential can be higher than the second intermediate electrical potential, and the third electrical potential can be lower than the first intermediate electrical potential. According to another embodiment of the above sensor system or method, the first electrical potential can be equal to the second intermediate electrical potential, and the third electrical potential can be equal to the first intermediate electrical potential. According to another embodiment of the above sensor system or method, the sensor system can be configured during each pre-charge phase, after a first time interval, to drive the node A to the first or third electrical potential during a second time interval, and during each acquisition phase to drive node A after a third time interval to the second or first intermediate electrical potential, respectively. According to another embodiment of the above sensor system or method, the sensor system can be configured, after the second time interval, to switch node A into tristate. According to another embodiment of the above sensor system or method, the sensor system can be configured during each pre-charge phase to drive after a fourth time interval the node B to the second or fourth electrical potential during a fifth time interval and thereafter to switch node B into tristate, and during each acquisition phase to keep node B in high-impedance at DC. According to another embodiment of the above sensor system or method, the first electrical potential and the second electrical potential can be the same and wherein the third electrical potential and the fourth electrical potential are the same. According to another embodiment of the above sensor system or method, a time interval when node A is at the first or third electrical potential and node B is at the second or fourth electrical potential may overlap, respectively. According to another embodiment of the above sensor system or method, the sensor system can be configured during the pre-charge phase of the first main phase to maintain node A at the first electrical potential, and during the acquisition phase of the first main phase to drive node A to the first intermediate electrical potential and during the pre-charge phase of the second main phase to maintain node A at the third electrical potential, and during the acquisition phase of the second main phase to drive node A to the second intermediate electrical potential. According to another embodiment of the above sensor system or method, each of the electrical nodes be galvanically coupled or connected to a port of an integrated circuit, wherein each of these ports is connected to a pad of a chip package. According to another embodiment of the above sensor system or method, node A can be used for touch and/or hover detection. According to another embodiment of the above sensor system or method, node B can be used for mid-range position and gesture detection. According to another embodiment of the above sensor system or method, analog-to-digital converters may be sampling during the acquisition phases. According to another embodiment of the above sensor system or method, the sensor system can be designed for detecting the position of at least one object on or in front of or near a touch panel. According to another embodiment of the above sensor system or method, a carrier frequency defined by the switching between the first and third electrical potential may be between 1 kHz and 1000 kHz. According to another embodiment of the above sensor system or method, the system may comprise one or more nodes A and each node A is connected to electrodes of a touch panel. According to another embodiment of the above sensor system or method, the system may comprise one or more nodes B and at least one node B is connected to electrodes of a touch panel. According to another embodiment of the above sensor system or method, the system may comprise one or more nodes A and at least one node B which is connected to electrodes of the second detection system arranged near a touch panel. According to another embodiment of the above sensor system or method, node A may be part of a first microcontroller for 2D touch and hover detection and node B may be part of a second microcontroller for 3D mid-range position and gesture detection. According to another embodiment of the above sensor system or method, the nodes A and B can be part of a microcontroller for joint 2D touch and hover detection and 3D position and gesture detection. According to another embodiment of the above sensor system or method, the sensor system may allow for seamless transition between 3D mid-range position detection, 2D hover position detection and touch position detection. According to another embodiment of the above sensor system or method, an electrode connected to node A may be used for touch and/or hover detection. According to another embodiment of the above sensor system or method, an electrode connected to node B may be used for 3D touchless position and/or gesture detection.

BRIEF DESCRIPTION OF THE DRAWINGS

FIG. 6b shows circuit diagram for measuring self capacitance according to the timing diagram shown in FIG. 6a;

DETAILED DESCRIPTION 2D touch detection systems have long evolved to standard human-machine interfaces, for example, in touch displays. Use cases for hover position tracking above such displays are, for example, the highlighting of displayed context underneath the hand, e.g. in a context menu or a task bar. For example, a display using such an interface may show generic information and when a user hand approaches the display and reaches a predefined distance a pop-up menu may show up. Furthermore, a finger may hover over the various menu buttons which may be displayed enlarged when the finger hovers above them. As soon as an actual touch is detected, the respective button may be highlighted, change color or another menu of functions may be displayed. Exemplary use cases for 3D gesture detection are flick gestures for navigating through a menu or switching an audio track, and circular movement gestures for audio volume control. Demand for such features has been addressed particularly in the automotive market.

As discussed above, there are existing solutions for stand-alone 2D touch/hover detection, e.g. maXTouch® chips, and there are other existing solutions for stand-alone 3D mid-range detection, e.g. MGC3xxx GestIC® chips, by Microchip Technology Inc. These systems employ capacitive sensing. They generate a repeated electrical stimulus and measure its impact on a quantity measured at a sensing electrode. This quantity is amplitude modulated by changes in the sensing electrode's capacitive environment, particularly by the position-dependent capacitances to a finger or a hand within this environment. The repetition frequency of this stimulus is called the carrier frequency, and it is typically in the range of 40 kHz to 250 kHz. Alongside this stimulus a capacitive sensor system is typically configured to run likewise periodic digital and/or analog drive and control sequences which may or may not be directly measurable, for example, for input port switches, amplifiers, analog-to-digital converters (ADC) or other front-end timings. One period of this set of simultaneous periodic stimulus and sequences is denoted as an Elementary Acquisition Cycle (EAC), i.e. an EAC itself is a non-periodic sequence.

Touch detection—particularly first-touch detection—with a maXTouch® controller is typically done by performing self-capacitance measurements where the sensing electrode is driven to so-called Virtual Earth (VE) electrical potentials during the measurements. Multiple electrodes of a sensor can be used for such self-capacitance measurements simultaneously. Further, electrodes which are currently not being sensed still can be driven the same way as the sensed electrodes, thus suppressing mutual-capacitance effects on the measured data, which is referred to as 'Driven Shield'.

Figure 2:
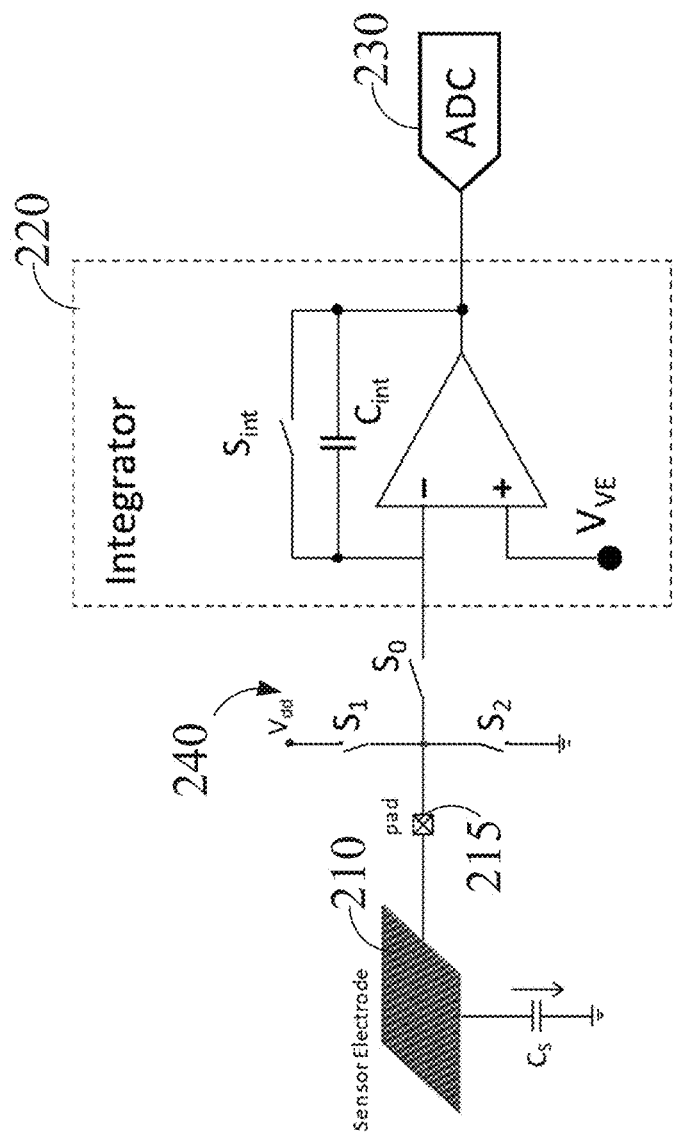
FIG. 2 shows circuit diagram for measuring self-capacitance.

FIG. 2 shows an example configuration for self-capacitance measurement of a sensor electrode with a circuit comprising a switching unit 240, an integrator 220 and associated ADC 230. The pad 215 and its connected sensor electrode 210 are pre-charged by closing either switch S1 to $V_{dd}$ or switch S2 to ground while S0 is open, and also switch Sint is closed to discharge the integration capacitor Cint while S0 is open. Then, for an acquisition phase, all switches are opened and then S0 is closed. Thereby, the pad 215 and its connected electrode 210 is driven to the VirtualEarth potential $V_{VE}$, and Cint is integrating the charge moving to or from the sensor electrode 210. The procedure can be repeated with pre-charging the sensor electrode 210 to the opposite potential, ground or Vdd, and using a different VirtualEarth electrical potential.

Figure 3:
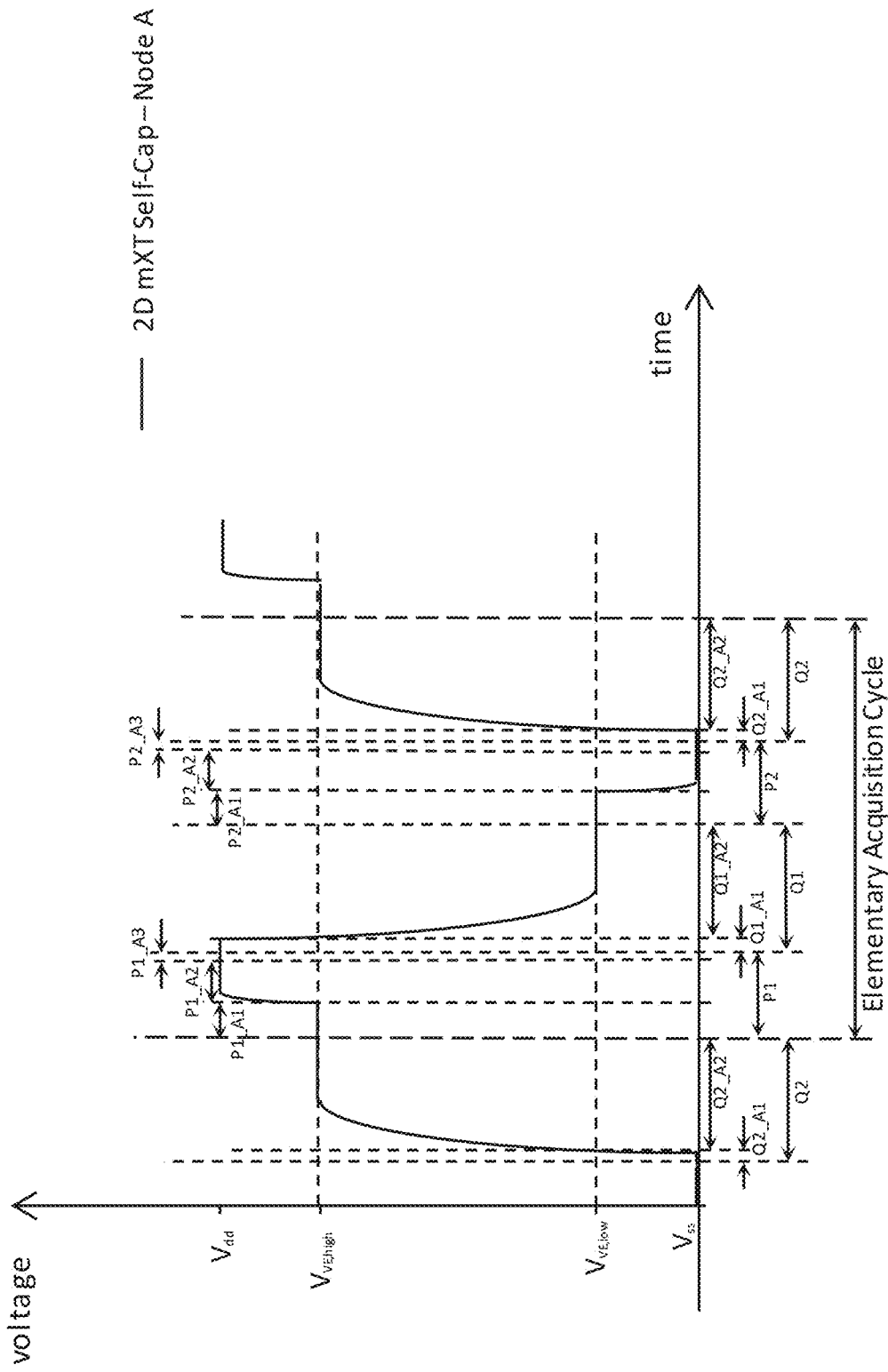
FIG. 3 shows a timing diagram for a specific self-capacitance measurement method.

FIG. 3 schematically shows a timing of the pad voltage, i.e. the stimulus, during a self-capacitance EAC which essentially consists of two main phases wherein each may comprise a pre-charge phase and an acquisition phase. Thus, according to an embodiment, in an EAC there are two pre-charge phases P1, P2 where the pad is driven to a desired electrical potential, and two acquisition phases Q1, Q2 where the pad is driven to other electrical potentials, the Virtual Earth potentials $V_{VE\_high}$ or $V_{VE\_low}$, and the amount of charge flowing to the pad is being measured. This can be accomplished, for example by a circuit as shown in FIG. 2 or by a current measurement of the respective driver circuit. This is also summarized in Table 1 with pre-charge phase P1 including sub-phases P1_A1, P1_A2 and P1_A3, acquisition phase Q1 with sub-phases Q1_A1 and Q1_A2, pre-charge phase P2 including sub-phases P2_A1, P2_A2 and P2_A3, acquisition phase Q2 with sub-phases Q2_A1 and Q2_A2. Further, in Table 1 we generalize the pre-charge voltage $V_{dd}$ in sub-phase P1_A2 to $V_{PC,high}$, and the pre-charge voltage Vss or ground in sub-phase P2_A2 to $V_{PC,low}$. Each pad—to which a sensor electrode can be connected—is galvanically connected to an electrical node of an electrical circuit. We refer to an electrical node which is driven with a driving sequence for Virtual Earth measurements as a node of Type A, or Node A. As known in the art, an electrical node is not considered to form any physical point in a circuit diagram, but essentially refers to anything which is galvanically coupled.

Figure 1:
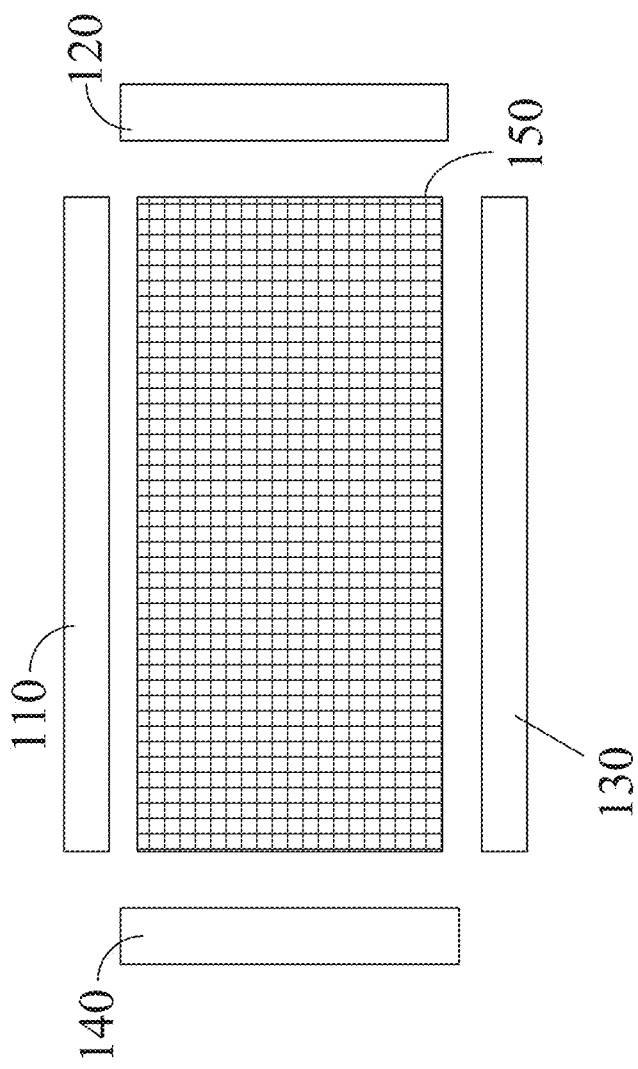
FIG. 1 shows a 2D/3D detection system operating with time multiplexing.
Figure 1A:
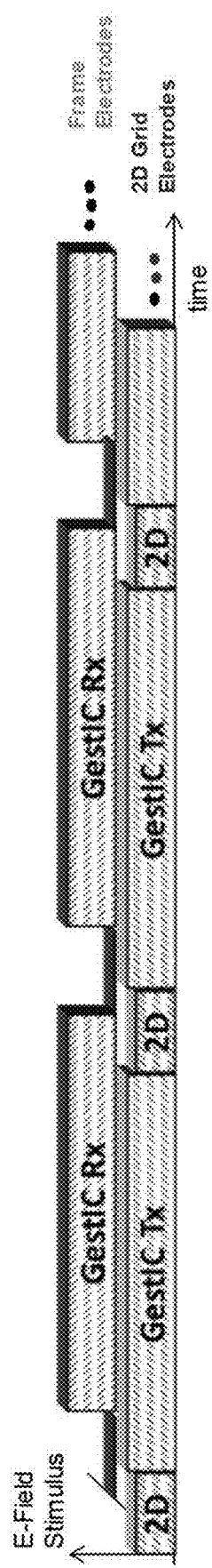
FIG. 1a shows a timing diagram for the system of FIG. 1.

The drive sequence is essentially the same for all 2D grid electrodes, i.e. horizontal and vertical electrodes of grid 150 in FIG. 1. However, typically only a subset of 2D electrodes is being sensed. Typically, subsets of electrodes are sensed in an alternating manner such that after an alternation cycle each electrode has been sensed at least once. Hereby, 'sensed' or 'sensing' refers to measuring the amount of electrical charge flowing to or from a 2D electrode during phases Q1 and Q2, respectively.

TABLE 1

Pre-Charge and Acquisition Phases

|  | Virtual Earth - Node A | CVD - Node B |
|---|---|---|
| Pre-Charge (P1) | P1_A1: indifferent<br>P1_A2: drive to $V_{PC,high}$<br>P1_A3 (optional): tristate | P1_B1: indifferent<br>P1_B2: drive to $V_{B,high}$<br>P1_B3: tristate |
| Acquisition (Q1) | Q1_A1: indifferent<br>Q1_A2: drive to $V_{VE\_low}$. | Q1_B: high-impedance @DC (capacitive reactance) not driven |
| Pre-Charge (P2) | P2_A1: indifferent<br>P2_A2: drive to $V_{PC,low}$<br>P2_A3 (optional): tristate | P2_B1: indifferent<br>P2_B2: drive to $V_{B,high}$<br>P2_B3: tristate |
| Acquisition (Q2) | Q2_A1: indifferent<br>Q2_A2: drive to $V_{VE\_high}$. | Q2_B: high-impedance @DC (capacitive reactance) not driven |

Each phase or sub-phase corresponds to a time slot in the EAC as shown in FIG. 3. First, during phase P1, the receiving pad on Node A with its connected receiving electrode is driven to $V_{PC,high}=V_{dd}$, then driven to $V_{VE\_low}$ during a so-called charge integration phase Q1, then the pad on Node A is driven to $V_{PC,low}=V_{ss}$ during phase P2, and then to $V_{VE\_high}$ during another charge integration phase Q2.

Phases P1 and Q1 can be jointly swapped with phases P2 and Q2 without affecting functionality. The pad—or more precisely the connected electrical node—can be put tristate any time as long as the driving states P1_A2, Q1_A2, P2_A2 and P2_A3 listed in Table 1 are maintained at least for some time within each corresponding time slot. The node state, i.e. whether the node is being driven, set high-impedance or tristate, during phases P1_A1, Q1_A1, P2_A1 and Q2_A1 does not affect the values measured during the acquisition phases and hence are marked as 'indifferent'.

Figure 4:
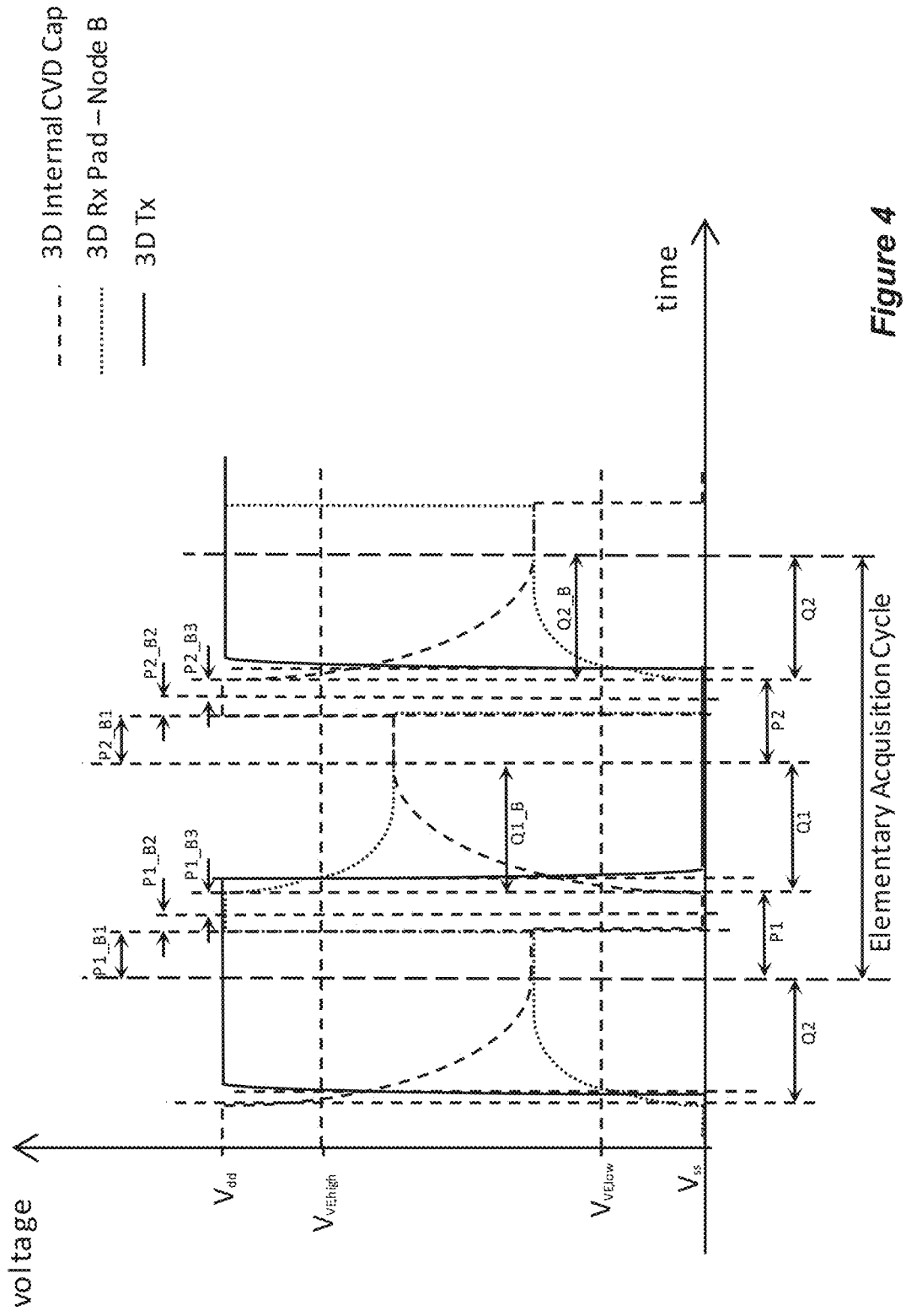
FIG. 4 shows the timing for 3D-only acquisition with CVD measurements.

For 3D measurements, the MGC3140 GestIC® controller by Microchip Technology Inc. performs combined self-capacitance and mutual-capacitance measurements, using so-called Capacitive Voltage Division (CVD) measurements, see also Application Note AN1478 published by the assignee of this application and hereby incorporated by reference in its entirety. While on an Rx sensing electrode a self-capacitance measurement is performed, on a neighboring so-called Tx electrode, connected to a Tx pad, the electrical potential is changed during the CVD acquisition phase. FIG. 4 schematically shows a timing diagram of the Tx pad voltage which essentially represents a second stimulus, the Rx (sensing) pad voltage, and the voltage on an internal capacitor during an EAC. As with Virtual Earth measurements, each pad—to which a sensor electrode can be connected—is galvanically connected to an electrical node of an electrical circuit. We refer to an electrical node which is driven with a driving sequence for CVD measurements as a node of Type B, or Node B. The drive sequence for one EAC on a Node B which can be connected to a CVD Rx pad and electrode is also listed in Table 1 in the column 'CVD—Node B': Essentially the sequence consists of pre-charging the pad connected to Node B alternatingly to two voltages $V_{B,high}$ and $V_{B,low}$, and then setting the pad high-impedance at direct current (DC), i.e. not driving the pad. In the example of FIG. 4, $V_{B,high}=V_{dd}$ and $V_{B,low}=V_{ss}$. One possible realization for high-impedance at DC is connecting the pad to a capacitive reactance, for example the sample capacitor of an ADC. Setting the pad high-impedance at DC is done for at least some of the time during phases Q1_B and Q2_B. According to another embodiment, the node can be tri-stated or for example, disconnected, for some time slots during Q1_B and Q2_B.

Multiple nodes A and nodes B may be implemented and depending on the system they can be evaluated in parallel or sequential. For example, a 3D detection system may use four or more sensor electrodes as shown in FIG. 11-18 with electrodes 110-140, and 180. These electrodes can be evaluated sequentially or in parallel according to various embodiments.

Figure 5:
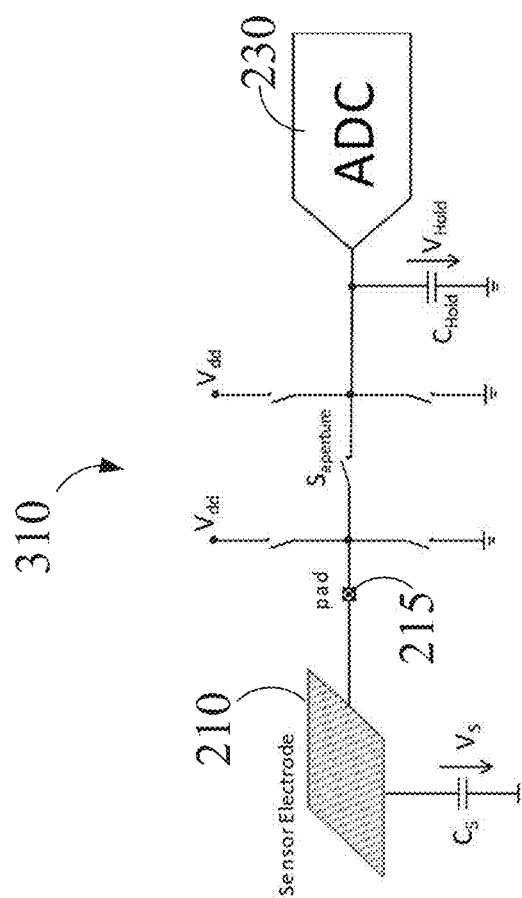
FIG. 5 shows circuit diagram for measuring self capacitance according to an embodiment.

FIG. 5 illustrates the principal configuration for CVD self-capacitance measurements with a switching unit 310 and associated ADC 230: with the switch $S_{aperture}$ of the switching unit 310 being opened, i.e. switched Off, the sensor electrode 210 with self-capacitance $C_s$ to ground is being pre-charged to either $V_{dd}$ or ground, and the ADC's 230 internal hold capacitor $C_{Hold}$ is pre-charged to the opposite electric potential, i.e. to ground when the sensor electrode 210 is being pre-charged to $V_{dd}$ and vice versa, by closing the respective switches of switching unit 310 to $V_{dd}$ and ground. Then, after pre-charging, all switches of switching unit 310 are opened and the aperture switch $S_{aperture}$ is closed. Consequently, it has to hold $V_s=-V_{Hold}$ and therefore the charges move between $C_s$ and $C_{Hold}$ to fulfill this equation. Then $V_{Hold}$ is measured by the ADC 230.

Assuming these two systems for 2D sensing and 3D sensing could be operated independently, examples for desired sensor layouts are shown in FIG. 11 to FIG. 14.

Figure 11:
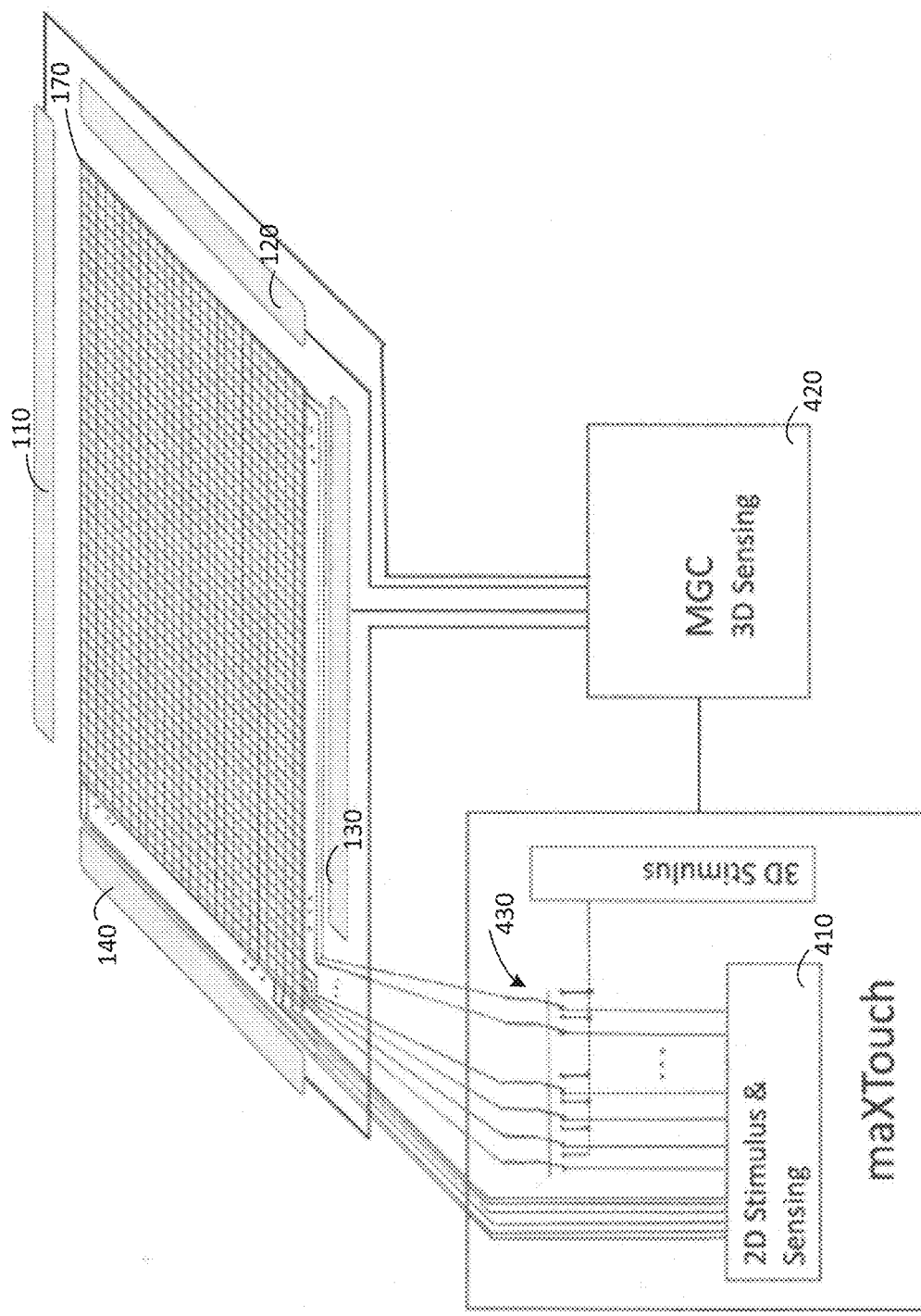
FIGS. 11 and 12 show embodiments with a 2D grid with horizontal and vertical Electrodes ('lines') and a frame of four more electrodes.
Figure 12:
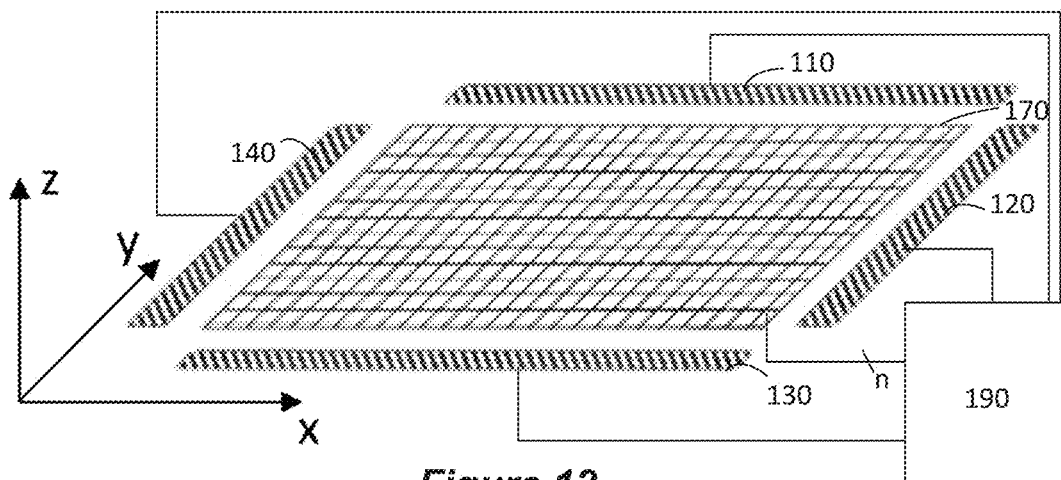

FIGS. 11 and 12 illustrate a standard rectangular touch panel with a 2D grid 170 of horizontal and vertical conductive lines or electrodes, for example made of transparent indium tin oxide (ITO), for 2D touch and hover position detection. FIG. 11 shows in addition how the touch grid can be used for touch position detection and for the proximity and 3D touch detection according to various embodiments. FIG. 11 shows in addition a 2D touch detection circuit 410 and 3D gesture detection circuit 420 with time-multiplexing 430. During the time of 2D sensing, the 3D frame electrodes 110, 120, 130, 140 are set to a constant electrical potential. During the time of 3D sensing, the touch controller 410 switches a set of 2D grid electrodes 170 to a 3D stimulus. This set could consist of only the columns as shown in FIG. 11. However, other embodiments may select only rows, a combination of certain columns and rows or all column and row electrodes.

FIG. 12 shows that n lines are used to connect this grid 170 with an evaluation circuit 190 according to an embodiment. Surrounding this touch panel are arranged four frame electrodes 110-140 for detecting the position of an object above the touch panel up to, for example, 10 cm from the touch panel surface. Due to lower sensitivity and detection range, the 2D touch detection system would typically be able to operate with the 2D electrode grid 170 of this layout no matter how the frame electrodes would be driven. The more sensitive 3D sensing with the frame electrodes 110-140, however, would highly benefit when the 2D sensor grid 170 could serve to provide a Tx stimulus. As a counter example, assuming the 2D grid 170 being set to ground potential or DC, then it would have similar effect to the 3D measurement values as an actually targeted finger, and this influence by the 2D grid 170 would mask partially or completely the effect of a finger onto the measurement values. In the example of the sensor layout in FIG. 12, the left and right frame electrode 140, 120 would be dominantly used for detecting the hand position in x-direction, and the top and bottom electrode 110, 130 would be dominantly used for detecting the hand position in y-direction. The drive sequence for the 3D frame electrodes is listed in the right column of Table 1 ("CVD—Node B"). The driving of the 2D grid electrodes is essentially the same for all 2D grid electrodes, as listed in Table 1 "VirtualEarth—Node A", and a subset of the 2D grid electrodes is being driven and sensed while the remaining 2D grid electrodes are only driven but not sensed or put onto a constant electrical potential.

Figure 13:
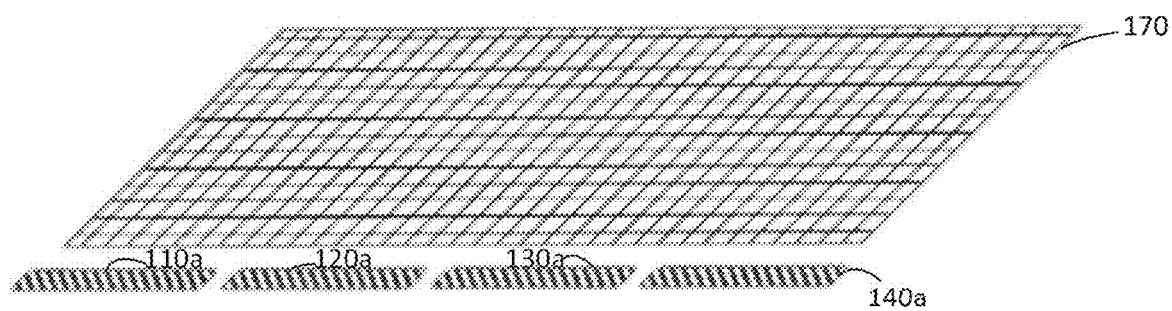
FIG. 13 shows another embodiment with a 2D grid with horizontal and vertical electrodes ('lines') and a segmented electrode near one side of the 2D grid.

FIG. 13 illustrates an approach with four GestIC® electrodes 110a, 120a, 130a, and 140a arranged alongside one edge of the 2D grid 170, which allows better 3D positioning in x-direction, but not in y-direction.

Figure 14:
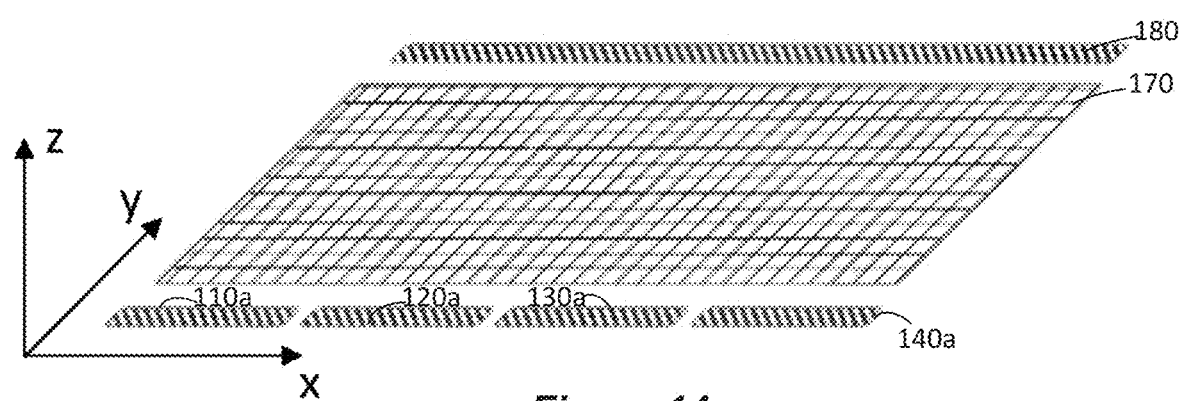
FIG. 14 shows another embodiment with a 2D Grid with horizontal and vertical electrodes ('lines'), a segmented electrode near one side of the 2D grid, and another electrode on the opposite side of the 2D grid.

FIG. 14 illustrates an approach with four GestIC® electrodes 110a-140a arranged alongside one edge of the 2D grid 170, plus another GestIC® electrode 180 arranged alongside another edge of the 2D grid 170.

Despite the fact that it would be desirable to use the 2D grid 170 to provide a stimulus during 3D sensing, the above mentioned stand-alone solutions cannot easily be operated in close vicinity to each other simultaneously: Both solutions perform capacitive sensing, and while the impact of such systems to their electrical environment typically is limited in range, as soon as the systems are operated close to each other they can be considered using the same physical channel. This further means that—unless the systems are properly configured for joint operation—each one is perceiving the other one as a noise source, which can deteriorate or completely collapse performance.

Existing solutions to this problem, as discussed in the background section, implement two systems in parallel, one for 2D touch sensing and one for 3D mid-range sensing, and these two systems do co-operate in terms of sharing the channel resource with time-multiplexing, i.e. in fact only one of the two systems is sensing at a time. This is a compromise of performance for each of the systems, with respect to response time, sensitivity, noise robustness and electro-magnetic emission.

According to various embodiments, for 2D Virtual Earth self-capacitance sensing, the electrical nodes connected to one or more sensing electrodes of a 2D electrode grid via chip pads are driven during the acquisition phase, changing the nodes' electrical potential from a higher level to a lower level (Phase Q1) or vice versa (Phase Q2). This driving of the electrical node and its connected electrodes can be utilized as a Tx stimulus for 3D GestIC® measurements on the frame electrodes, cf. '3D Tx' in FIG. 4. Consequently, the carrier frequencies for 2D and 3D sensing need to be matched. The 2D electrodes which are currently not being sensed can still be driven with the same stimulus, such that the electrical field excited by the 2D grid 170—which is influencing the 3D frame electrode measurement values—is independent of which of the 2D electrodes of the 2D grid 170 are being sensed at a time. This has the advantage that the evaluation of the 3D frame electrode measurement data can be handled fully independent of the 2D sensing, because the 3D measurement is only affected by the 2D grid's outer appearance, i.e. how the 2D electrodes are driven, and not by the 2D internal signal evaluation. Further, driving also the electrodes which currently are not being sensed yields the beforementioned effect of suppressing mutual-capacitance influences between the driven electrodes.

Since with this approach the self-capacitance measurements on the 2D grid electrodes can be performed up to 100% of the time, i.e. they are not limited by time-multiplexing 3D sensing as with the state-of-the-art solution, and there is no longer an additional delay to the first-touch detection.

Figure 6:
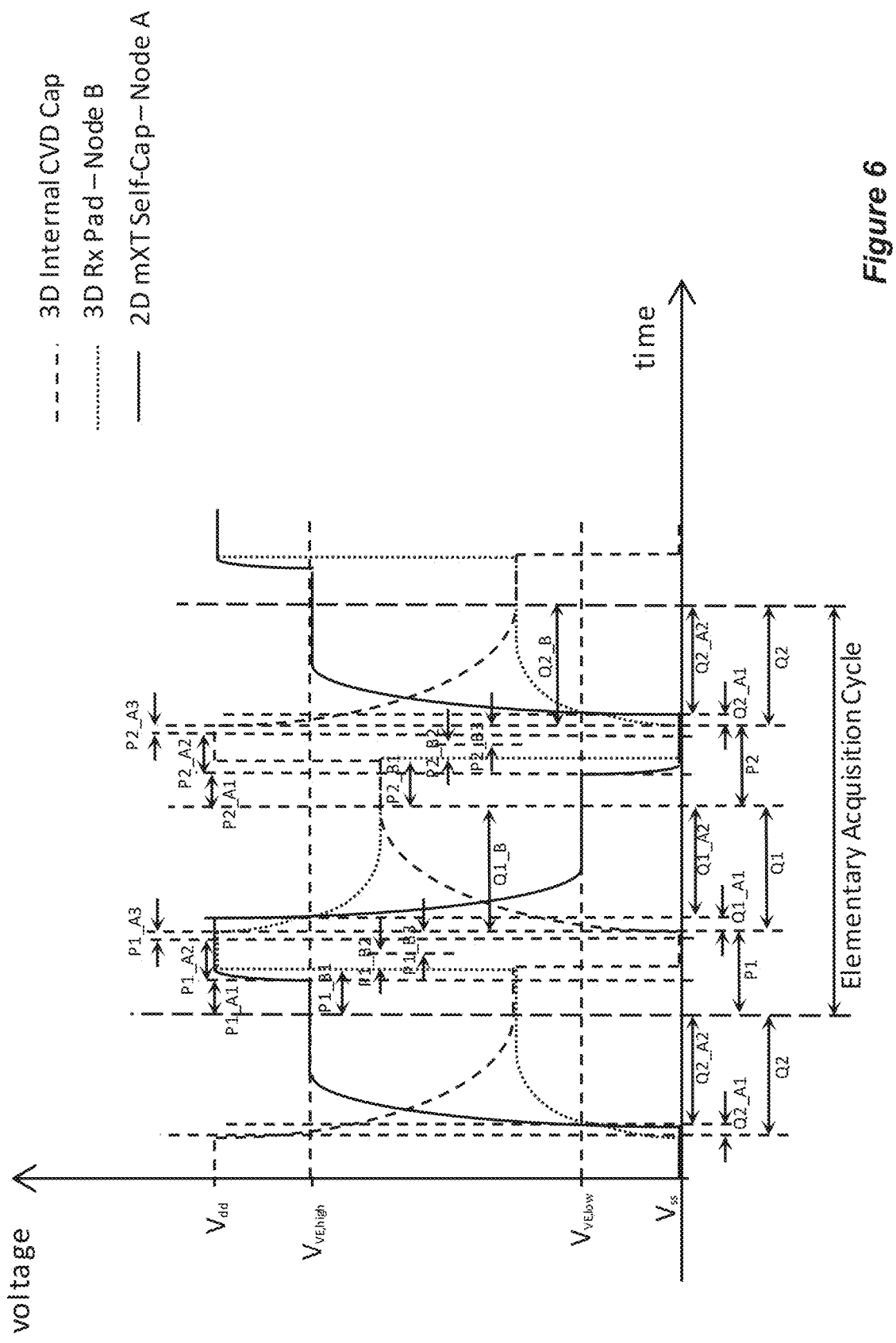
FIGS. 6 and 6a show timing diagrams of embodiments according to the present application.

A first example of a resulting drive-and-sense sequence is shown in the timing diagram of FIG. 6 which also shows annotations of the various timing phases and of one EAC.

The signal '2D mXT Self-Cap—Node A' can be driven the same way as for a 2D-only touch sensing system, cf FIG. 3. The same time, 3D-measurements can be obtained by measuring the electrical potential, for example, at the end of the acquisition phases Q1 and Q2, where the signal '2D mXT Self-Cap' is exploited as a Tx stimulus.

Figure 15:
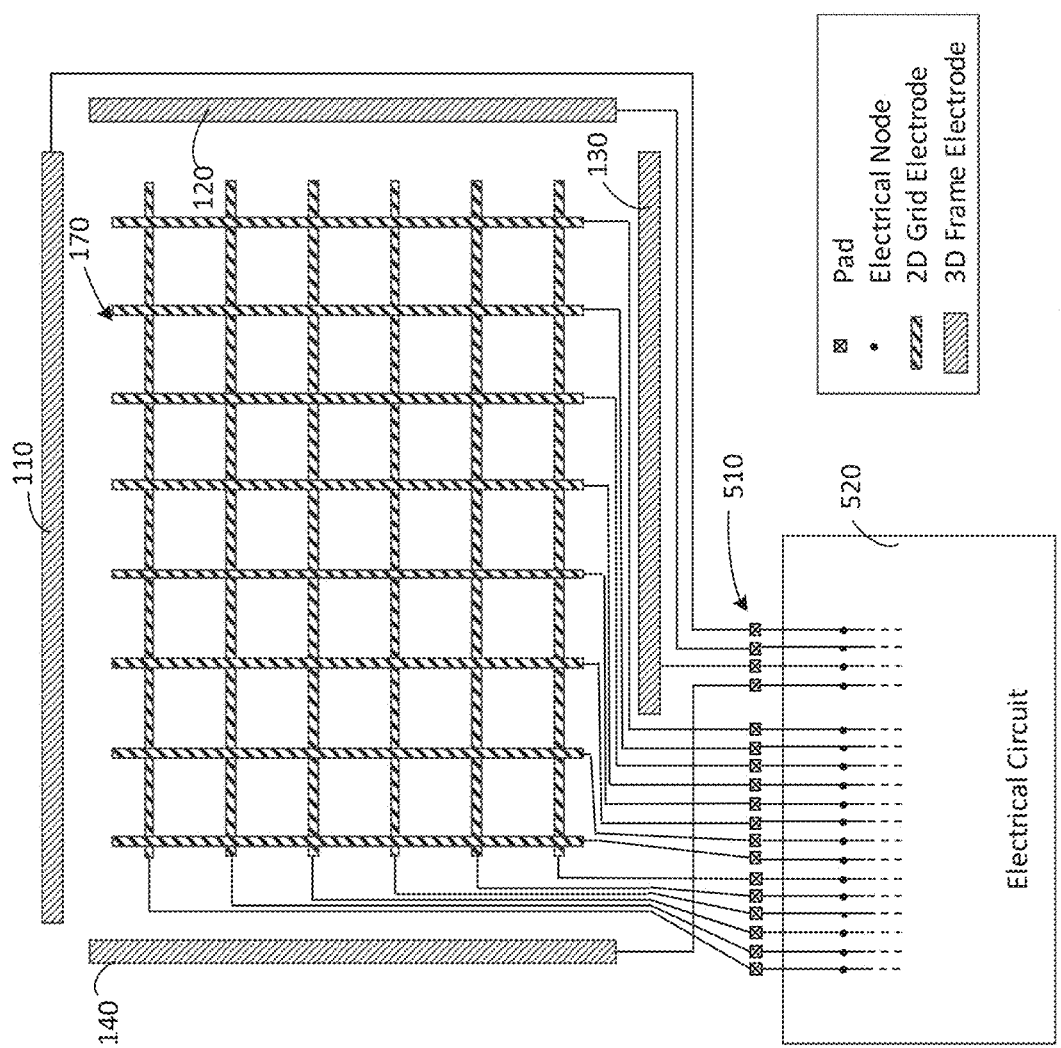
FIGS. 15-18 show various further embodiments of sensor arrangements.

FIG. 15 illustrates a standard rectangular touch panel 170 with a 2D grid of horizontal and vertical conductive sensor lines or electrodes, and surrounding 3D Rx frame electrodes 110-140. Each of the electrodes is galvanically connected to a pad 510 which itself is connected to an electrical node in an electrical circuit 520.

Figure 16:
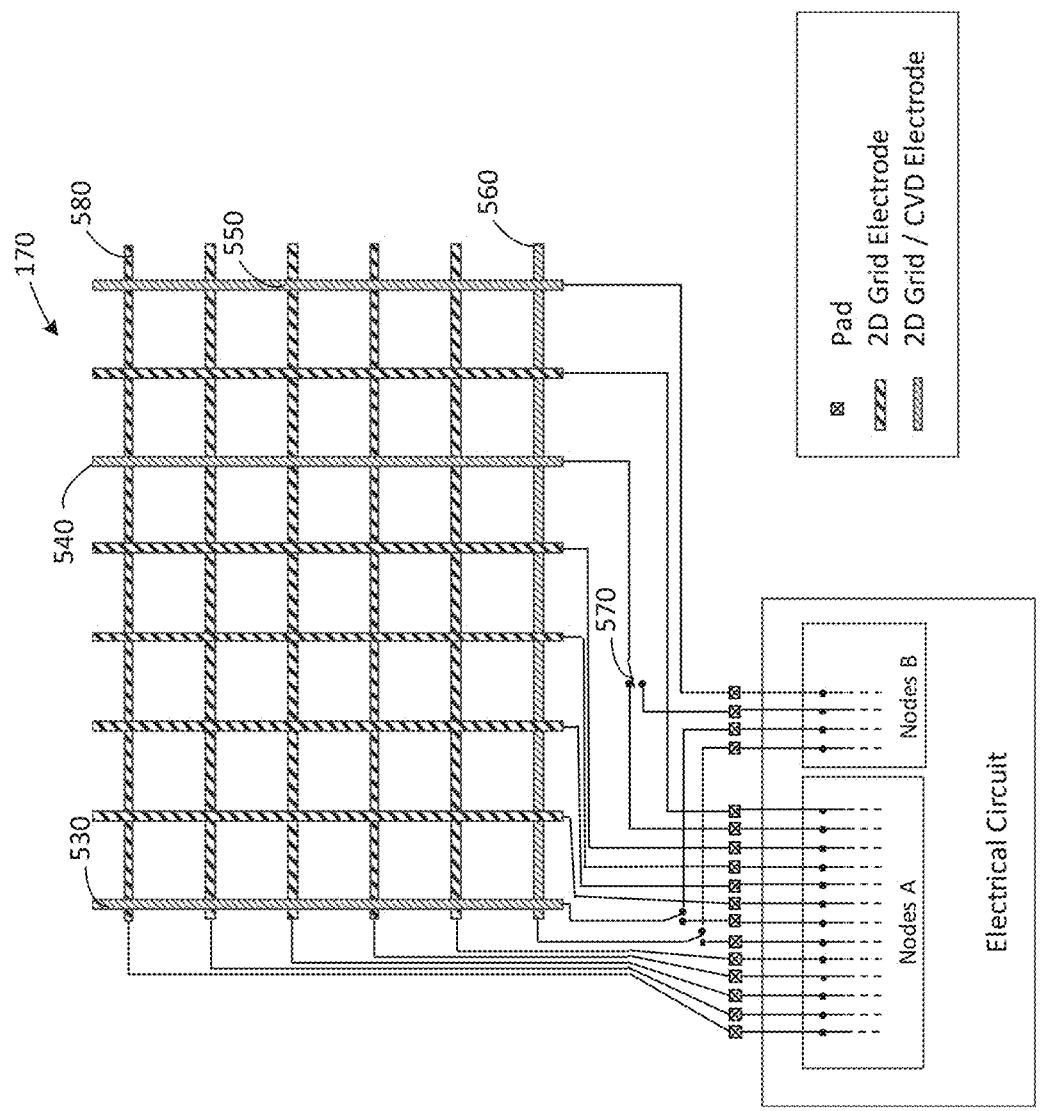

FIG. 16 illustrates a standard rectangular touch panel 170 with a 2D grid of horizontal and vertical conductive sensor lines or electrodes, some of which are permanently connected to electrical nodes of type A or type B, and some, for example electrodes 530, 540, and 560, can be multiplexed between nodes of type A or type B be respective multiplexers 570. As can be seen any of the available electrodes could be either permanently assigned to one of the 2D or 3D detection circuit. For example, to form a frame similar to electrodes 110-140 of FIG. 15, instead of electrode 540, electrode 580 could be variably assigned to the 3D detection circuit. Any suitable fixed, configurable, or mixed configuration is possible according to specific requirements of an application.

Figure 17:
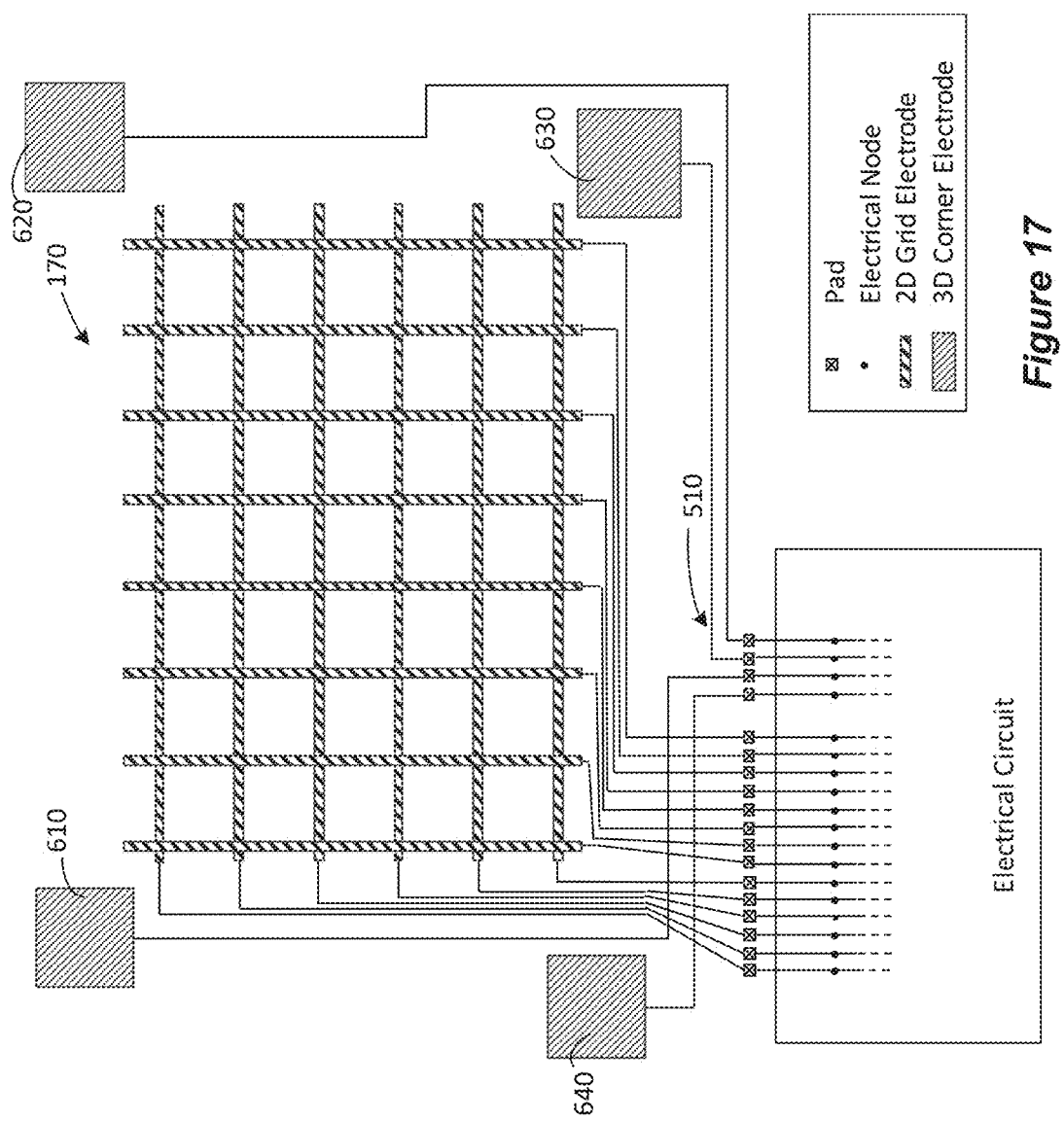

FIG. 17 illustrates another embodiment with a standard rectangular touch panel 170 with a 2D grid of horizontal and vertical conductive sensor lines or electrodes, and surrounding 3D Rx corner electrodes 610, 620, 630, 640.

Figure 18:
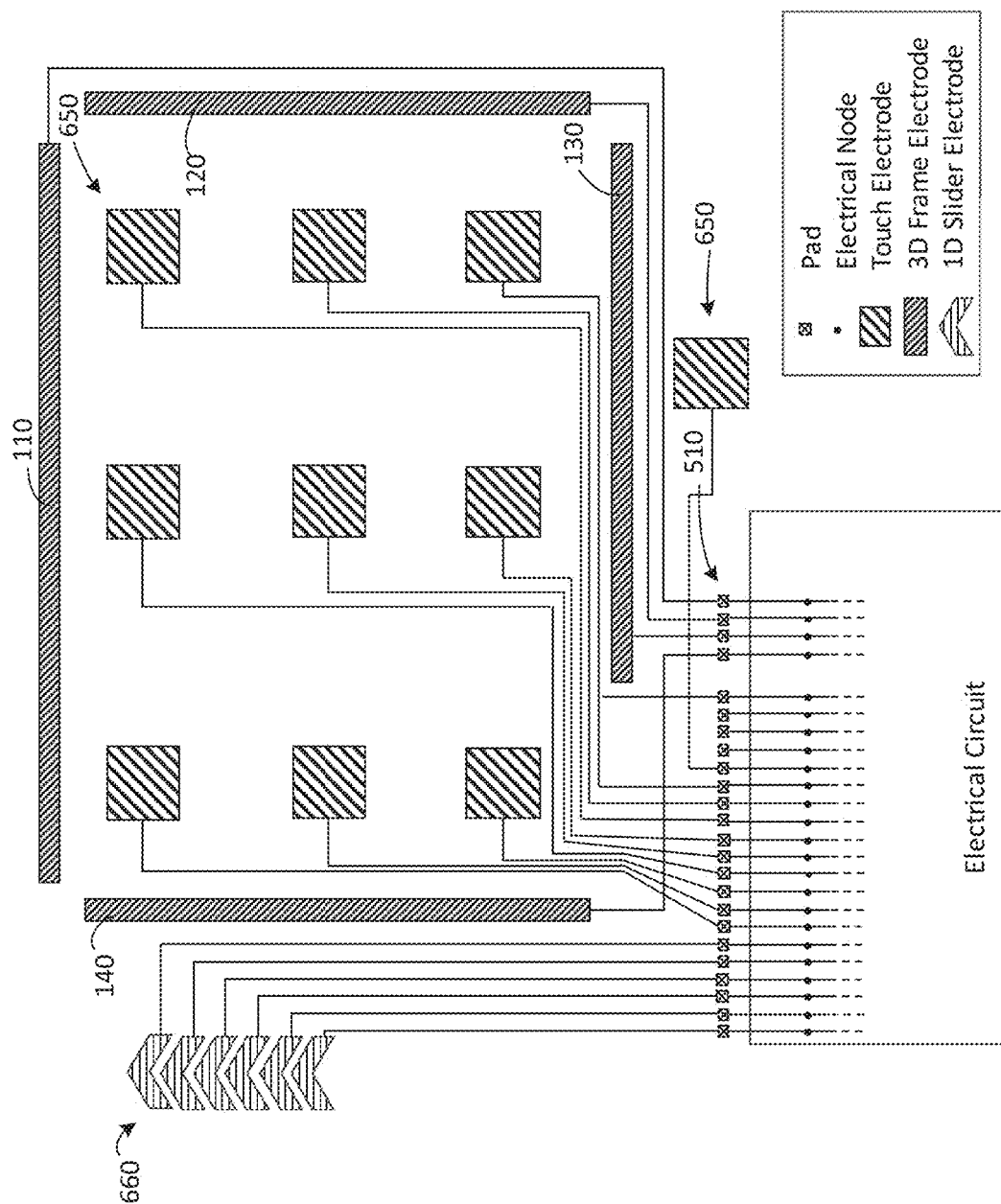

FIG. 18 illustrates standard capacitive touch buttons 650 and a standard capacitive slider electrode arrangement 660, and 3D Rx frame electrodes 110-140.

Figure 10:
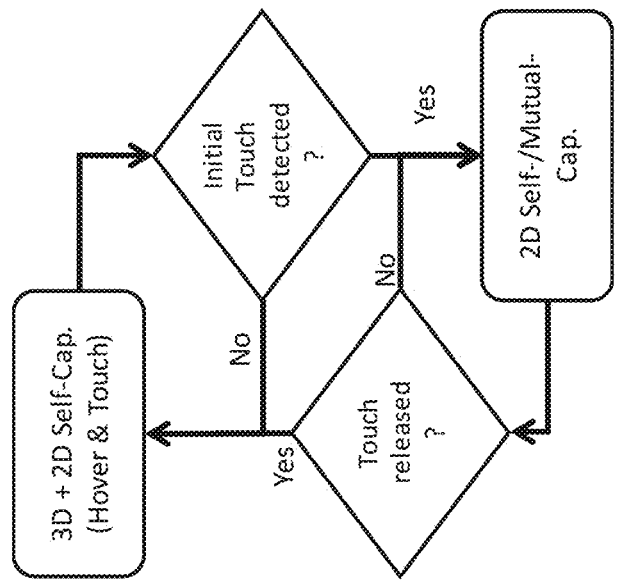
FIG. 10 shows a state diagram with conventional switching.
Figure 9:
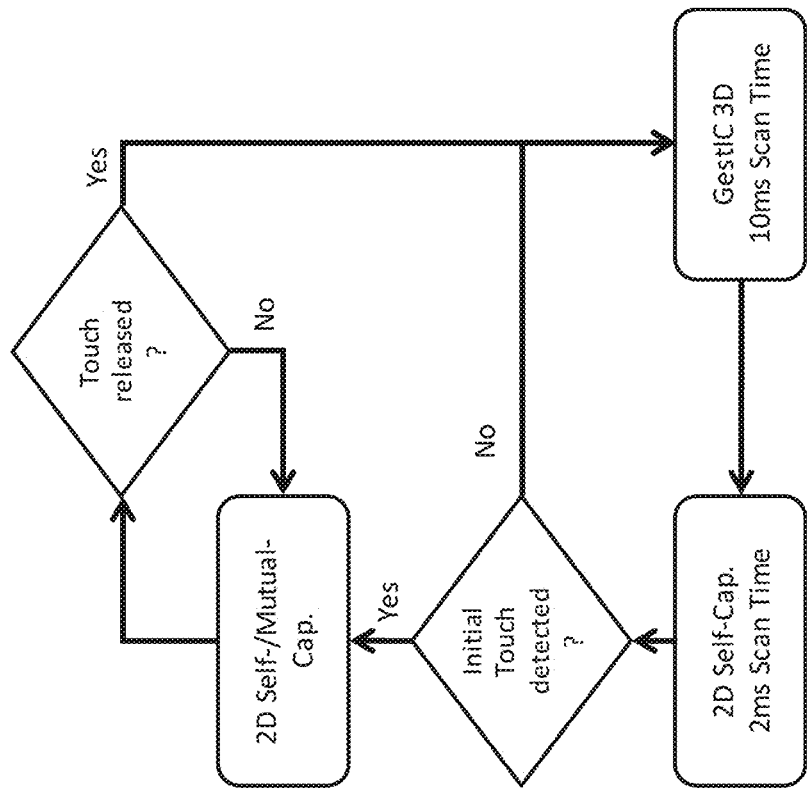
FIG. 9 shows a simplified state diagram of conventional time-multiplexing.

FIG. 10 shows a possible state-diagram for switching between a) GestIC® mid-range position and gesture detection using measurement data, for example, from frame electrodes, together with self-capacitance hover detection from measurement data, for example, from the 2D electrode grid, and b) a pure touch and hover detection mode which is active as long as a touch of the 2D electrode grid is detected. A switch to the latter mode is only required upon detection of an initial touch, and possibly for any kind of calibration scans.

In an alternative implementation, 3D measurements are performed also while one or more touches are being detected. For example, they are performed while doing self-capacitance measurements on the 2D electrode grid, which can, for example, happen in a repeated manner and alternatingly with mutual-capacitance measurements.

The pre-charge sub-phases P1_A2 and P1_B2, and likewise P2_A2 and P2_B2, can have the same start time and/or the same stop time, but this is not required. For example, in FIG. 6 we see that P1_A2 starts before P1_B2—the start of P1_B2 is when the 3D Rx Pad signal jumps to $V_{dd}$—and then P1_A2 and P1_B2 overlap for some time until P1_B2 ends as is indicated in FIG. 6, or P1_A2 ends (not visible in FIG. 6). In the following, non-preferred variants of the proposed approach are presented, together with their advantages and disadvantages.

Figure 7:
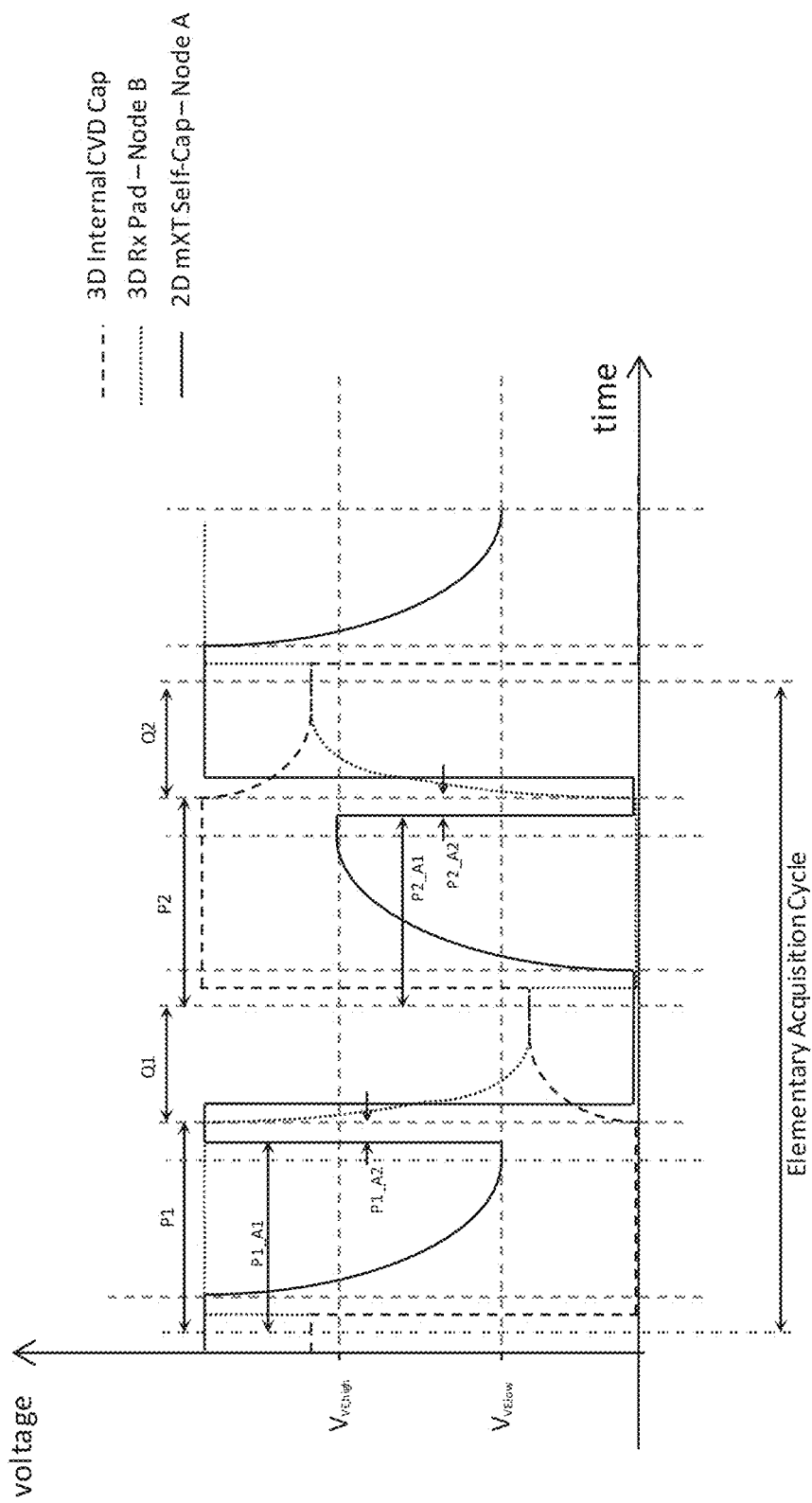
FIG. 7 shows a timing diagram of yet another embodiment showing overlay 2D and 3D scan cycles for interleaved sensing.

Interleaved Sensing:

Table 1 shows the different phases, or time slots, of an EAC for 2D VirtualEarth (Node A) and 3D CVD measurements (Node B). With this preferred approach, according to various embodiments, both the 2D sensing and the 3D sensing occur during phases Q1 and Q2. Alternatively, these two phases could also be used for 3D sensing where the "2D mXT Self-Cap" signal only provides a stimulus for these 3D CVD measurements, i.e. not sensing the 2D lines during phases Q1 and Q2. Instead, the 2D sensing would happen during extended phases P1_A1 and P2_A1. This is illustrated in the alternate timing diagram of FIG. 7. Having separated the acquisition phases for 2D and 3D measurements in time, the signals on the electrodes which are currently not being sensed may be chosen to support the current measurement. For example, the pads for 3D sensing could be set to a constant electrical potential during the 2D acquisition phase as is shown in FIG. 7, or they could be driven to the same electrical potential as the pads for the 2D electrodes (not shown in FIG. 7). This approach can be interpreted as interleaving 2D and 3D measurements within an EAC where (parts of) the 2D grid is driven with a Tx stimulus for 3D sensing while it is not used for 2D self-capacitance measurements. A potential drawback could be that this additional portion of stimulus increases the overall power consumption and electromagnetic emission compared to the preferred approach in FIG. 6.

Further potential drawbacks of this Interleaved-Sensing solution may be: 1) Analog-to-Digital Conversion: The sampling time instances for 2D/hover measurements and 3D GestIC® are interleaved. That is, either the ADC timings for 2D/hover measurements and 3D measurements need to be controlled individually, or—for common timing of all ADCs—every other resulting digital sample needs to be discarded, i.e. discarding the 2D/hover measurement sample while keeping the 3D GestIC® measurement sample, and vice versa. The latter would approximately double the ADC conversion speed requirements. However, considering that the state-of-the-art system is typically operated at 40-50 kHz due to EMC constraints, the resulting maximum sampling frequency still would only be 200 kHz.

2) Signal Settling Time: Due to the interleaved measurements, the time available for signal settling is reduced compared to the preferred approach or a 2D/3D-only system operating at the same carrier frequency. This might become relevant for larger displays with ITO electrodes and higher operating frequencies. Higher carrier frequencies, however, are presently not expected considering the EMC constraints and resulting operating frequency choices (~40-50 kHz) for the state-of-the-art approach.

Figure 6A:
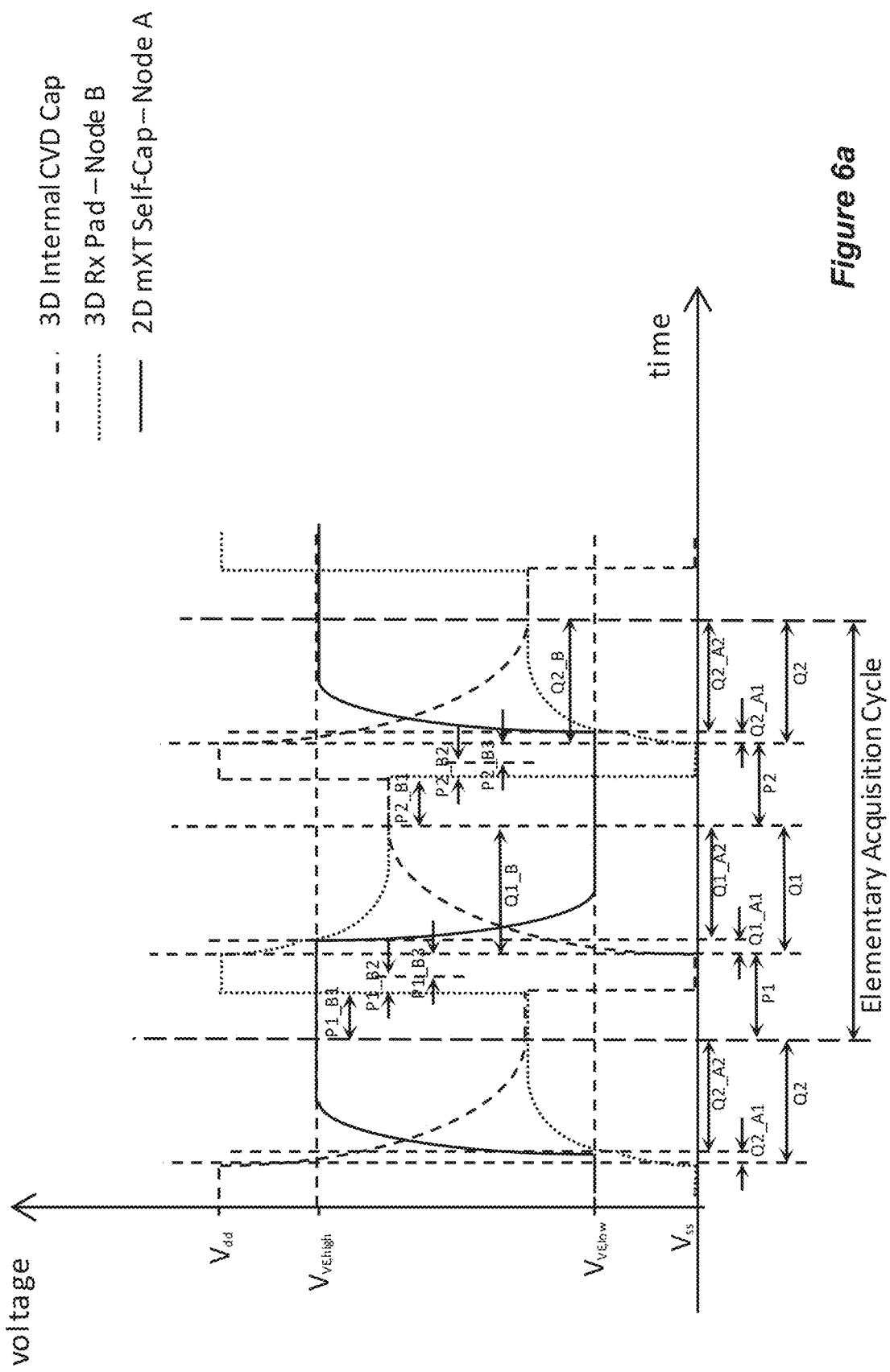
Figure 6B:
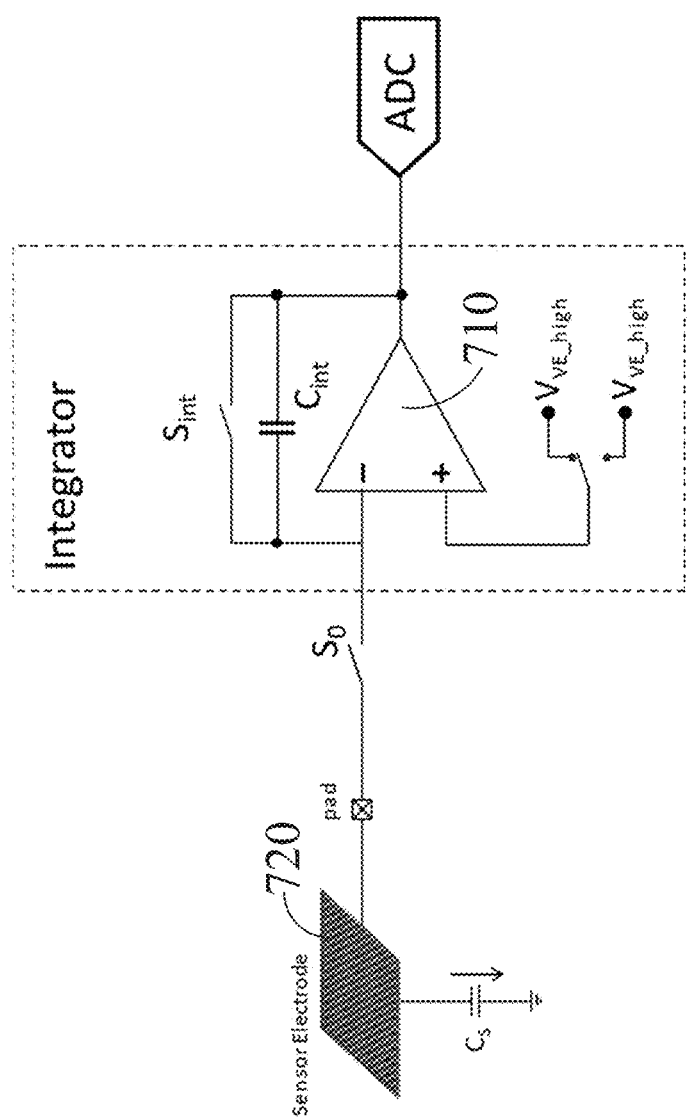
Figure 8:
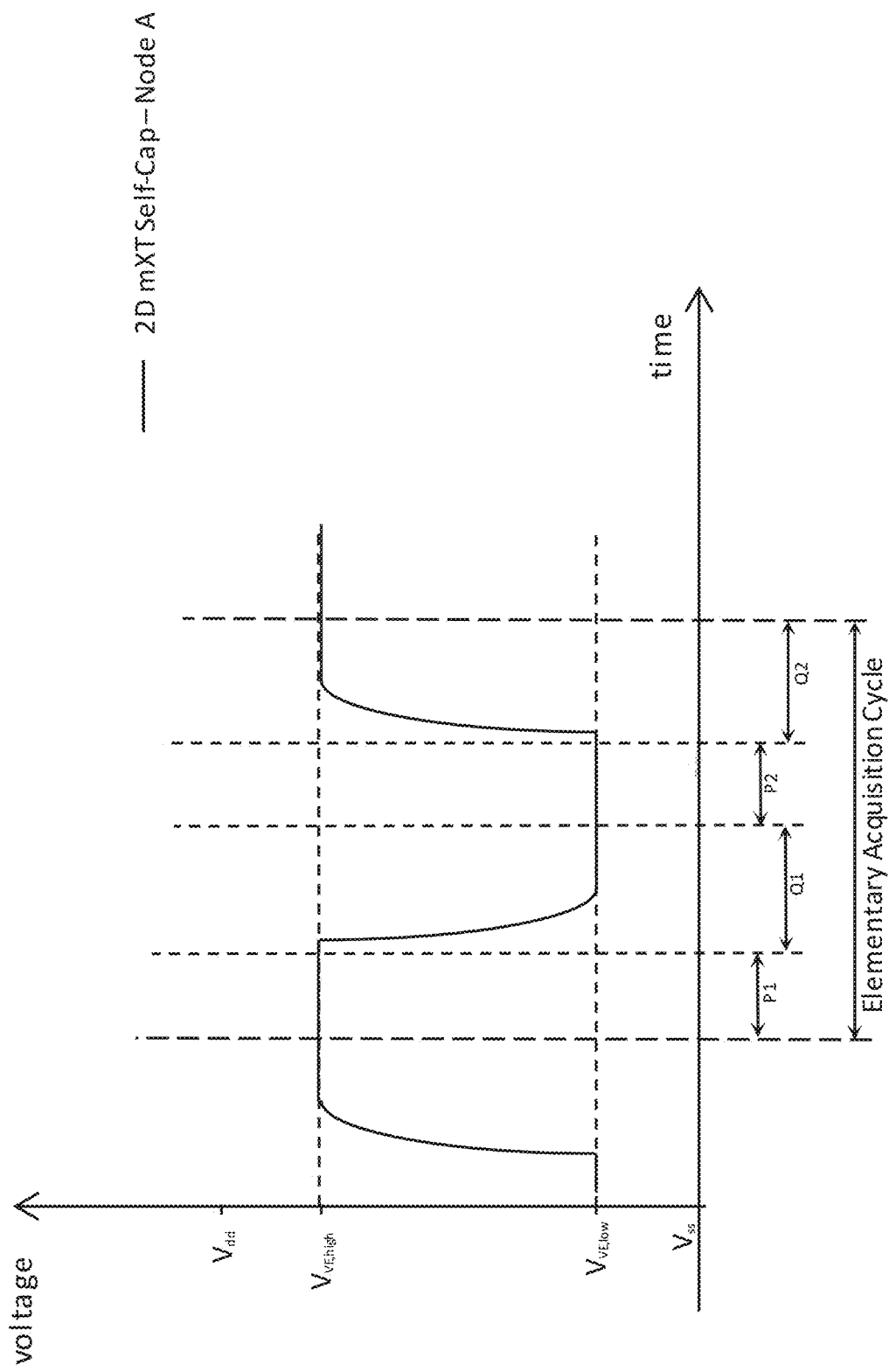
FIG. 8 shows a timing diagram with a 2D pad drive sequence when pre-charging to $V_{VE\_high}$ and $V_{VE\_low}$ is performed according to yet another embodiment.

2D VE Self-Capacitance Measurements with Pre-Charge to $V_{VE\_high}$ and $V_{VE\_low}$: Instead of driving the 2D sensing nodes to $V_{PC,high}=V_{dd}$ and $V_{PC,low}=V_{ss}$ during the pre-charge phases P1_A2 and P2_A2, respectively, they can also be driven to other electrical potentials. For example, they can be driven to $V_{PC,high}=V_{VE\_high}$ and $V_{PC,low}=V_{VE\_low}$, as for example shown in FIG. 8 where the electrical potential is constant during phases P1 and P2, respectively. Since the nodes have been driven to these voltages already during the respective preceding acquisition phases, active driving may not even be necessary, and the pads can be set tristate alternatively. This is further illustrated in FIG. 6a. FIG. 6b shows an exemplary system configuration for such measurements. In this embodiment, the integrator comprises operational amplifier 710 configured as an integrator wherein the inverting input can be coupled with the sensor electrode 720 and the non-inverting input can be selectively coupled with either $V_{VE\_high}$ or $V_{VE\_low}$.

2D CVD Self-Capacitance Measurements: Instead of actively driving the 2D sensor nodes during phases Q1 and Q2, an alternative approach is to set them to high-impedance at DC, similar to the 3D CVD sensor nodes. Further, the pre-charge potentials to which the pads are driven during phases P1_A2 and P2_A2 could be chosen as $V_{dd}$ and $V_{ss}$ for better sensitivity, respectively.

To limit the number of sensing lines for 2D self-capacitance measurements while simultaneously performing 3D mid-range measurements—for example, because of a limited number of analog receive channels—two or more 2D sensing lines could be short-circuited to the same electrical node to be sensed. When connecting neighboring lines, hover positioning should still be possible with sufficient accuracy when only connecting few, for example two or three, lines. As an extreme case, all horizontal, all vertical, or all 2D sensing lines would be connected to a single 2D sensing node. This, of course, would no longer allow to perform any 2D position estimation, but only an approach and (first-) touch detection. Also, the capacitive load of the electrode grid 170 would likely be challenging for signal driving.

The various embodiments bring a number of advantages compared to the state-of-the-art time-multiplexing solution:

The 2D first-touch response time remains as short as it would be for a pure 2D touch detection system, i.e., there would not be any additional delay to first-touch detection: In contrast to the state-of-the-art approach where 2D scans can only be performed, for example, during 2 ms out of 10 ms, with the proposed solution there no longer is such limitation. First-touch response time is a feature of high importance both for user experience and marketing—this is a major selling-point.

In the state-of-the-art solution, the 2D measurement time is very limited—it merely suffices to yield a reliable first-touch detection. With the proposed solution, there is no longer a time limit due to time-multiplexing, hence the SNR of the 2D signals can benefit significantly, which will allow, for example, near-distance hover detection. With mid-range position estimation using, for example, GestIC® together with simultaneous 2D hover detection, a gradual transition between mid-range (coarser resolution) and near-range (finer resolution) becomes possible.

Electromagnetic emission is very critical to customers. Both with the state-of-the-art approach and with the proposed approach there is an electrical stimulus 100% of the time. But only with the proposed approach the analog information available due to this stimulus is accessible for both 2D and 3D sensing at 100% of the time. For example, with the state-of-the-art approach it is only 83%. Conversely this means that with the proposed approach we could lower the amplitude of the stimulus signal, thus reducing emission, while still yielding the same SNR as with the state-of-the-art.

Figure 19:
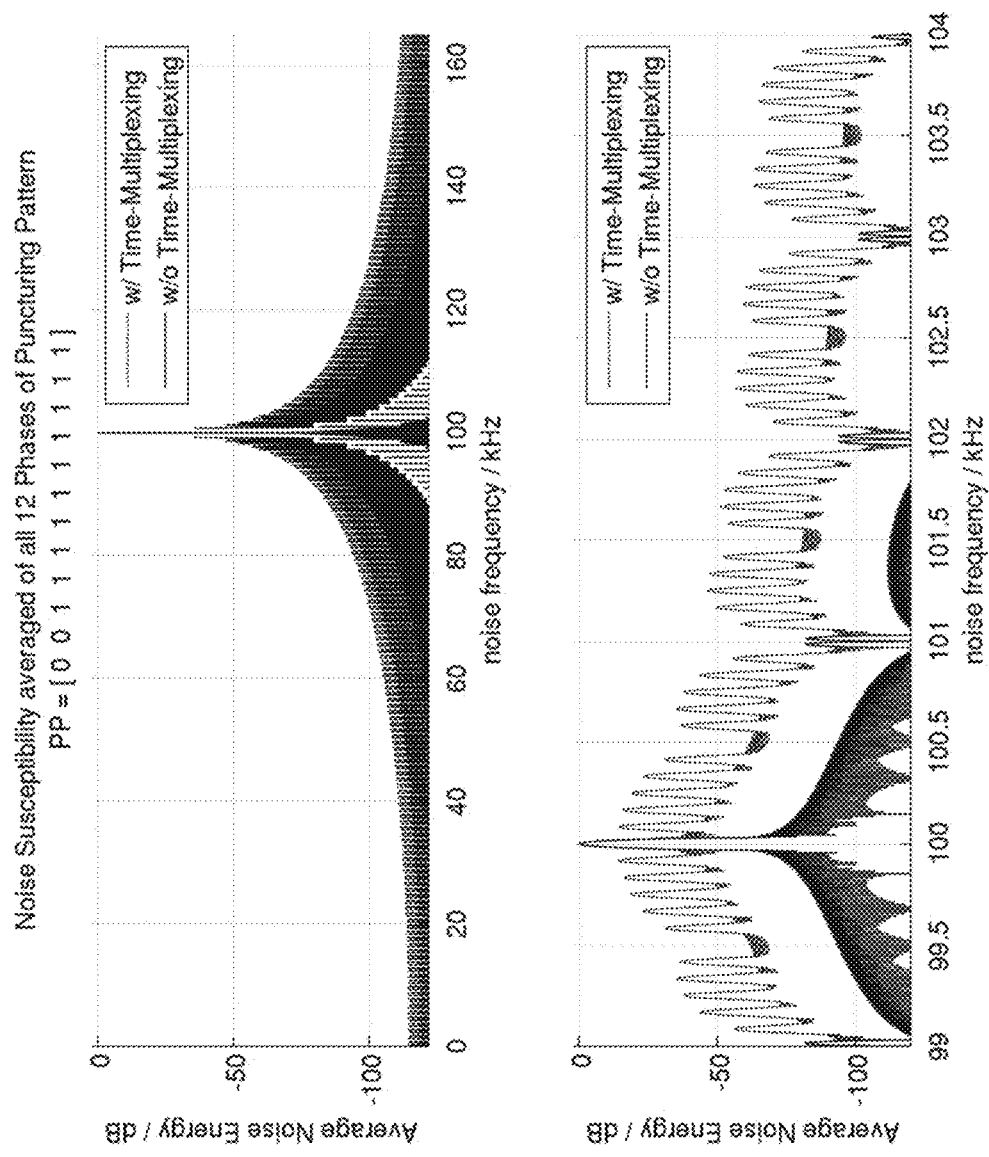
FIG. 19 shows Noise Susceptibility with and without Time-Multiplexing.

Improved Noise Robustness for 3D measurements: Digital low-pass filters typically expect input values sampled at regular time intervals. Their filtering performance is deteriorated when samples are missing as it is the case in the state-of-the-art time-multiplexing system. For the proposed approach, the data acquisition remains uninterrupted, and hence the digital filter's noise suppression is equal to the case without time-multiplexing in FIG. 19.

Simplification of the overall sensing system I: Because for higher-level algorithms the acquired data looks as if it would have been obtained with a 2D-only or 3D-only system, respectively, algorithmic advances can more easily distributed onto a broader product range: A differentiation between 2D-/3D-only systems and the proposed approach would become obsolete. This allows shorter development cycles.

Simplification of the overall sensing system II: Typical systems for capacitive sensing employ an adaptive frequency selection algorithm which allows to switch to another carrier frequency when the noise level at the current one is too high. Since with the proposed approach both the 2D system and 3D system operate at same carrier frequency, only one algorithmic instance for finding the best or a good carrier frequency is required.

The proposed approach provides for a maXTouch® silicon for 2D and 3D position and gesture detection. Further, such a solution can support multi-level Virtual Earth potentials using, for example, a 6-bit digital-to-analog converter, meaning that the shape of the driving signal during phases Q1_A1, Q2_A1 (and possibly also P1_A1 and P2_A1) can be better optimized for reducing electromagnetic emission. With respect to 2D sensing performance it only matters that the node potential is essentially/substantially decreasing or increasing during Q1 and Q2, respectively, and eventually reaches a defined value—as provided due to driving the nodes to specific stop values during Q1_A2 and Q2_A2.

The electrodes of the 2D electrode grid can be connected to the same electrical circuit as the GestIC electrodes, or they can be connected to one or more other electrical circuits. In the latter case, a signaling link between the two or more electrical circuits needs to be established.

The invention claimed is:

1. A sensor system combining a first detection system and a second detection system;
   wherein the sensor system is configured to supply drive signals to electrodes of the first detection system and the second detection system, wherein the drive signals comprise a drive sequence consisting of a repetition of an elementary acquisition cycle, each elementary acquisition cycle comprising two consecutive main phases,
   wherein during a first main phase, the sensor system is configured, during a pre-charge phase of the first main phase, to drive a node A coupled with at least one electrode of the first detection system to a first electrical potential for at least a predefined time of the pre-charge phase of the first main phase and during an acquisition phase of the first main phase, to drive node A to a first intermediate electrical potential for at least a predefined time of the acquisition phase of the first main phase, and to drive a node B coupled with at least one electrode of the second detection system to a second electrical potential for at least a predefined time of the pre-charge phase of the first main phase and thereafter to switch node B into high-impedance at DC for at least a predefined time of the acquisition phase of the first main phase, and
   wherein during a second main phase, the sensor system is configured, during a pre-charge phase of the second main phase, to drive node A to a third electrical potential for at least a predefined time of the pre-charge phase of the second main phase and, during an acquisition phase of the second main phase, to drive node A to a second intermediate electrical potential for at least a predefined time of the acquisition phase of the second main phase, and to drive node B to a fourth electrical potential for at least a predefined time of the pre-charge phase of the second main phase and thereafter to switch node B into high-impedance at DC for at least a predefined time of the acquisition phase of the second main phase, and
   wherein the first detection system is further configured to perform an electrical measurement on node A, and
   wherein the second detection system is further configured to perform an electrical measurement on node B.

2. The sensor system according to claim 1, wherein the first detection system is further configured to perform an electrical measurement on node A while driving node A to the first and second intermediate electrical potential, respectively, and
   wherein the second detection system is further configured to measure an electrical potential on node B which is reached after switching node B into high-impedance at DC.

3. The sensor system of claim 1, wherein the first intermediate electrical potential is lower than the first electrical potential, and wherein the second intermediate is higher than the third electrical potential.

4. The sensor system of claim 1, wherein the first electrical potential is higher than the second intermediate electrical potential, and wherein the third electrical potential is lower than the first intermediate electrical potential.

5. The sensor system of claim 1, wherein the first electrical potential is equal to the second intermediate electrical potential, and wherein the third electrical potential is equal to the first intermediate electrical potential.

6. The sensor system of claim 1, wherein the sensor system is configured during each pre-charge phase, after a first time interval, to drive the node A to the first or third electrical potential during a second time interval, and during each acquisition phase to drive node A after a third time interval to the second or first intermediate electrical potential, respectively.

7. The sensor system of claim 6, wherein the sensor system is configured, after the second time interval, to switch node A into tristate.

8. The sensor system of claim 6, wherein a time interval when node A is at the first or third electrical potential and node B is at the second or fourth electrical potential overlap, respectively.

9. The sensor system of claim 1, wherein the sensor system is configured during each pre-charge phase to drive after a fourth time interval the node B to the second or fourth electrical potential during a fifth time interval and thereafter to switch node B into tristate, and during each acquisition phase to keep node B in high-impedance at DC.

10. The sensor system of claim 1, wherein the first electrical potential and the second electrical potential are the same and wherein the third electrical potential and the fourth electrical potential are the same.

11. The sensor system of claim 1, wherein the sensor system is configured during the pre-charge phase of the first main phase to maintain node A at the first electrical potential, and during the acquisition phase of the first main phase to drive node A to the first intermediate potential and
   wherein during the pre-charge phase of the second main phase to maintain node A at the third electrical potential, and during the acquisition phase of the second main phase to drive node A to the second intermediate electrical potential.

12. The sensor system of claim 1, wherein each of the electrical nodes is galvanically coupled or connected to a port of an integrated circuit, wherein each of these ports is connected to a pad of a chip package.

13. The sensor system of claim 1, wherein node A is used for touch and/or hover detection.

14. The sensor system of claim 1, wherein node B is used for mid-range position and gesture detection.

15. The sensor system of claim 1, wherein analog-to-digital converters are sampling during the acquisition phases.

16. The sensor system of claim 1, wherein the sensor system is designed for detecting the position of at least one object on or in front of or near a touch panel.

17. The sensor system of claim 1, wherein a carrier frequency defined by the switching between the first and third electrical potential is between 1 kHz and 1000 kHz.

18. The sensor system of claim 1, wherein the system comprises one or more nodes A and each node A is connected to electrodes of a touch panel.

19. The sensor system of claim 1, wherein the system comprises one or more nodes B and at least one node B is connected to electrodes of a touch panel.

20. The sensor system of claim 1, wherein the system comprises one or more nodes A and at least one node B which is connected to electrodes of the second detection system arranged near a touch panel.

21. The sensor system of claim 1, wherein node A is part of a first microcontroller for 2D touch and hover detection and node B is part of a second microcontroller for 3D mid-range position and gesture detection.

22. The sensor system of claim 1, wherein the nodes A and B are part of a microcontroller for joint 2D touch and hover detection and 3D position and gesture detection.

23. The sensor system of claim 22, wherein the sensor system allows for seamless transition between 3D mid-range position detection, 2D hover position detection and touch position detection.

24. The sensor system of claim 1, wherein an electrode connected to node A is used for touch and/or hover detection.

25. The sensor system of claim 1, wherein an electrode connected to node B is used for 3D touchless position and/or gesture detection.

26. A method for combining a first detection method and a second detection method, the method comprising:
   supplying drive signals to electrodes, wherein the drive signals comprise a drive sequence consisting of a repetition of an elementary acquisition cycle, each elementary acquisition cycle (EAC) consisting of two consecutive main phases,
   wherein during a first main phase, driving a node A coupled with at least one electrode, during a pre-charge phase of the first main phase, to a first electrical potential for at least a predefined time of the pre-charge phase of the first main phase and, during an acquisition phase of the first main phase, driving node A to a first intermediate electrical potential for at least a predefined time of the acquisition phase of the first main phase, and driving a node B to a second electrical potential for at least a predefined time of the pre-charge phase of the first main phase and thereafter to switch node B into high-impedance at DC for at least a predefined time of the acquisition phase of the first main phase, and
   wherein during a second main phase, driving node A, during a pre-charge phase of the second main phase, to a third electrical potential for at least a predefined time of the pre-charge phase of the second main phase and, during an acquisition phase of the second main phase, driving node A to a second intermediate electrical potential for at least a predefined time of the acquisition phase of the second main phase, and driving node B to a fourth electrical potential for at least a predefined time of the pre-charge phase of the second main phase and thereafter to switch node B into high-impedance at DC for at least a predefined time of the acquisition phase of the second main phase,
   performing an electrical measurement on node A, and
   performing an electrical measurement on node B.

27. The method according to claim 26, further comprising performing an electrical measurement on node A while driving node A to the first and second intermediate electrical potential, respectively, and
   measuring an electrical potential on node B which is reached after switching node B into high-impedance at DC.

28. The method of claim 26, wherein the first intermediate electrical potential is lower than the first electrical potential, and wherein the second intermediate is higher than the third electrical potential.

29. The method of claim 26, wherein the first electrical potential is higher than the second intermediate electrical potential, and wherein the third electrical potential is lower than the first intermediate electrical potential.

30. The method of claim 26, wherein the first electrical potential is equal to the second intermediate electrical potential, and wherein the third electrical potential is equal to the first intermediate electrical potential.

31. The method of claim 26, wherein during each pre-charge phase after a first time interval, node A is driven to the first or third electrical potential during a second time interval, and during each acquisition phase node A is driven after a third time interval to the second or first intermediate electrical potential, respectively.

32. The method of claim 31, wherein after the second time interval node A is switched into tristate.

33. The method of claim 31, wherein a time interval when node A is at the first or third electrical potential and node B is at the second or fourth electrical potential overlap, respectively.

34. The method of claim 26, wherein during each pre-charge phase after a fourth time interval, node B is driven to the second or fourth electrical potential during a fifth time interval and thereafter node B is switched into tri-state, and during each acquisition phase node B is kept in high-impedance at DC.

35. The method of claim 26, wherein the first electrical potential and the second electrical potential are the same and wherein the third electrical potential and the fourth electrical potential are the same.

36. The method of claim 26, wherein during the pre-charge phase of the first main phase the node A is maintained at the first electrical potential, and during the acquisition phase of the first main phase the node A is driven to a first intermediate electrical potential, and wherein during the pre-charge phase of the second main phase the node A is maintained at the third electrical potential, and during the acquisition phase of the second main phase the node A is driven to the second intermediate electrical potential.

\* \* \* \* \*